(12) United States Patent
Yoshimi

(10) Patent No.: US 12,147,565 B2
(45) Date of Patent: Nov. 19, 2024

(54) IMAGE PROCESSING APPARATUS, IMAGE PROCESSING METHOD AND RECORDING MEDIUM

(71) Applicant: NEC CORPORATION, Tokyo (JP)

(72) Inventor: Kosuke Yoshimi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/639,123

(22) PCT Filed: Jul. 7, 2021

(86) PCT No.: PCT/JP2021/025604
§ 371 (c)(1),
(2) Date: Feb. 28, 2022

(87) PCT Pub. No.: WO2023/281654
PCT Pub. Date: Jan. 12, 2023

(65) Prior Publication Data
US 2024/0037271 A1    Feb. 1, 2024

(51) Int. Cl.
*G06F 21/62* (2013.01)
*G06T 5/77* (2024.01)
*G06V 10/60* (2022.01)
*G06V 40/18* (2022.01)

(52) U.S. Cl.
CPC ............ *G06F 21/6245* (2013.01); *G06T 5/77* (2024.01); *G06V 10/60* (2022.01); *G06V 40/18* (2022.01); *G06T 2207/30201* (2013.01)

(58) Field of Classification Search
CPC .... G06F 21/6245; G06V 10/44; G06V 10/60; G06V 40/18; G06V 40/19; G06T 7/00; G06T 5/77; G06T 1/00; G06T 2207/30201

USPC ............................................. 726/27; 713/186
See application file for complete search history.

(56) References Cited

U.S. PATENT DOCUMENTS

| 7,519,199 | B2 * | 4/2009 | Kondo ...................... G06T 5/77 340/5.83 |
| 7,925,058 | B2 * | 4/2011 | Lee ......................... G06V 40/19 382/117 |
| 9,836,647 | B2 * | 12/2017 | Perna .................... E05B 49/006 |
| 10,061,982 | B2 * | 8/2018 | Kim ........................ G04G 21/00 |

(Continued)

FOREIGN PATENT DOCUMENTS

| JP | 2001-186325 A | 7/2001 |
| JP | 2004-023733 A | 1/2004 |

(Continued)

OTHER PUBLICATIONS

International Search Report for PCT Application No. PCT/JP2021/025604, mailed on Sep. 28, 2021.

*Primary Examiner* — Amare F Tabor
(74) *Attorney, Agent, or Firm* — Sughrue Mion, PLLC

(57) ABSTRACT

An image processing apparatus 1 includes: a detecting unit 11 that detects an iris area IA including an iris from a person image IMG1 in which at least an eye of the target person is included; an image processing unit 12 that converts the person image to a protected image IMG2 in which an iris information relating to a pattern of the iris is not obtainable by performing an image processing on at least a part of the iris area of the person image; and an adding unit 13 that adds meta data indicating that the image processing is performed on at least a part of the iris area to the protected image.

6 Claims, 14 Drawing Sheets

(56) References Cited

U.S. PATENT DOCUMENTS

| | | | |
|---|---|---|---|
| 10,185,875 B2* | 1/2019 | Makino | H04N 23/611 |
| 11,200,437 B2* | 12/2021 | Zhou | G06V 10/143 |
| 2001/0022853 A1 | 9/2001 | Takaoka | |
| 2002/0059521 A1* | 5/2002 | Tasler | G07C 9/37 |
| | | | 713/186 |
| 2003/0235326 A1 | 12/2003 | Morikawa et al. | |
| 2003/0235411 A1 | 12/2003 | Morikawa et al. | |
| 2005/0226470 A1 | 10/2005 | Kondo et al. | |
| 2008/0025574 A1 | 1/2008 | Morikawa et al. | |
| 2009/0141946 A1 | 6/2009 | Kondo et al. | |
| 2009/0161965 A1 | 6/2009 | Kondo et al. | |
| 2012/0062720 A1* | 3/2012 | Choi | G06V 10/993 |
| | | | 348/78 |
| 2013/0250087 A1* | 9/2013 | Smith | G06F 3/013 |
| | | | 348/78 |
| 2015/0243063 A1* | 8/2015 | Yoon | G06F 21/84 |
| | | | 345/634 |
| 2016/0335495 A1* | 11/2016 | Kim | G06V 10/993 |
| 2017/0091520 A1* | 3/2017 | Ishii | G06V 40/193 |

FOREIGN PATENT DOCUMENTS

| | | | |
|---|---|---|---|
| JP | 3768225 B2 | 4/2006 | |
| JP | 4174244 B2 | 10/2008 | |
| JP | 4976156 B2 | 7/2012 | |
| JP | 2014-093639 A | 5/2014 | |
| JP | 2017-131302 A | 8/2017 | |

* cited by examiner

IMAGE PROCESSING APPARATUS, IMAGE PROCESSING METHOD AND RECORDING MEDIUM

CROSS REFERENCE TO RELATED APPLICATIONS

This application is a National Stage of International Application No. PCT/JP2021/025604 filed Jul. 7, 2021.

TECHNICAL FIELD

The present disclosure relates to a technical field of an image processing apparatus, an image processing method and a recording medium that are configured to prevent an abuse of an iris information relating to an iris of a person included in an image, for example.

BACKGROUND ART

A Patent Literature 1 discloses one example of an image processing apparatus that is configured to prevent an abuse of an iris information relating to an iris of a person included in an image. The Patent Literature 1 discloses an image processing apparatus that detects an iris area from an image and performs an image conversion on the detected iris area so that characterizing data that is unique to a person is not extractable.

Additionally, there are Patent Literatures 2 to 6 as a background art document relating to the present disclosure.

CITATION LIST

Patent Literature

Patent Literature 1: JP3768225B
Patent Literature 2: JP2017-131302A
Patent Literature 3: JP4976156B
Patent Literature 4: JP4174244B
Patent Literature 5: JP2004-023733A
Patent Literature 6: JP2001-186325A

SUMMARY

Technical Problem

It is an example object of the present disclosure to provide an image processing system, an image processing method and a recording medium that aims to an improvement of a technique disclosed in the background art document.

Solution to Problem

One example aspect of an image processing apparatus includes: a detecting unit that detects an iris area including an iris from a person image in which at least an eye of the target person is included; an image processing unit that performs an image processing on at least a part of the iris area of the person image; and an adding unit that adds a processing information relating to the image processing to the person image on which the image processing is already performed.

One example aspect of an image processing method includes: detecting an iris area including an iris from a person image in which at least an eye of the target person is included; performing an image processing on at least a part of the iris area of the person image; and adding a processing information relating to the image processing to the person image on which the image processing is already performed.

One example aspect of a recording medium is a recording medium on which a computer program that allows a computer to execute an image processing method is recorded, the image processing method includes: detecting an iris area including an iris from a person image in which at least an eye of the target person is included; performing an image processing on at least a part of the iris area of the person image; and adding a processing information relating to the image processing to the person image on which the image processing is already performed.

DESCRIPTION OF EXAMPLE EMBODIMENTS

Next, an example embodiment of an image processing apparatus, an image processing method and a recording medium will be described with reference to the drawings.

(1) First Example Embodiment

Firstly, a first example embodiment of the image processing apparatus, the image processing method and the recording medium will be described. In the below described description, the first example embodiment of the image processing apparatus, the image processing method and the recording medium will be described by using an image processing apparatus 1 to which the first example embodiment of the image processing apparatus, the image processing method and the recording medium is adapted.

Figure 1:
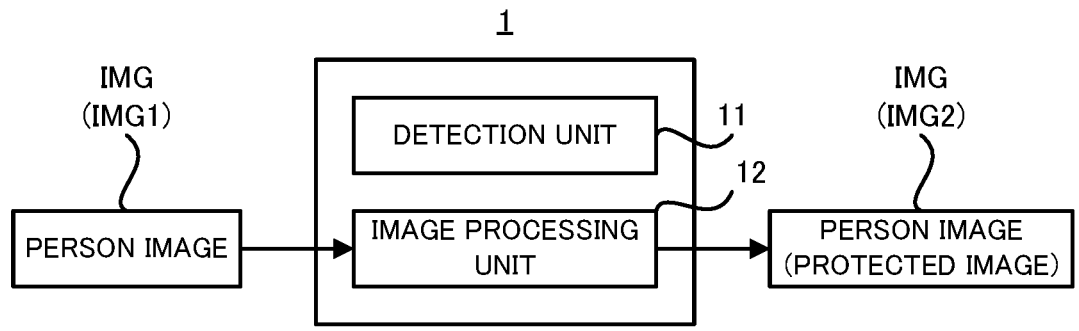
FIG. 1 is a block diagram that illustrates a configuration of an image processing apparatus in a first example embodiment.

FIG. 1 is a block diagram that illustrates a configuration of the image processing apparatus 1 in the first example embodiment. As illustrated in FIG. 1, the image processing apparatus 1 includes a detection unit 11 and an image processing unit 12. The detection unit 11 detects an iris area including an iris from a person image IMG in which at least an eye of a target person is included. The image processing unit 12 performs an image processing on at least a part of the iris area. The image processing may include a processing for converting the person image IMG to a person image IMG in which an iris information relating to the iris is not obtainable from the iris area, for example. Incidentally, in the below description, the person image IMG on which the image processing is not performed is referred to as a "person image IMG1" and the person image IMG on which the image processing is already performed is referred to as a "protected image IMG2 to distinguish both.

Here, since the person image IMG1 is an original image on which the above described image processing is not performed, there is a possibility that the iris information is obtainable from the iris area of the person image IMG1. As a result, when the person image IMG1 in which the eye of the target person is included is used by an user that is different from the target person, a first technical problem that the iris information obtainable from the iris area of the person image IMG1 is possibly abused by the user (especially, the user having a malicious intent) occurs. However, the image processing apparatus 1 in the first example embodiment converts the person image IMG1 to the protected image IMG2 in which the iris information is not obtainable from the iris area. Thus, when not the person image IMG1 but the protected image IMG2 is used by the user, the user cannot obtain the iris information from the iris area of the protected image IMG2. As a result, an abuse of the iris information is prevented. Namely, the image processing apparatus 1 in the first example embodiment is capable of solving the above described first technical problem.

(2) Second Example Embodiment

Next, a second example embodiment of the image processing apparatus, the image processing method and the recording medium will be described. In the below described description, the second example embodiment of the image processing apparatus, the image processing method and the recording medium will be described by using an image processing apparatus 2 to which the second example embodiment of the image processing apparatus, the image processing method and the recording medium is adapted.

(2-1) Configuration of Image Processing Apparatus 2

Figure 2:
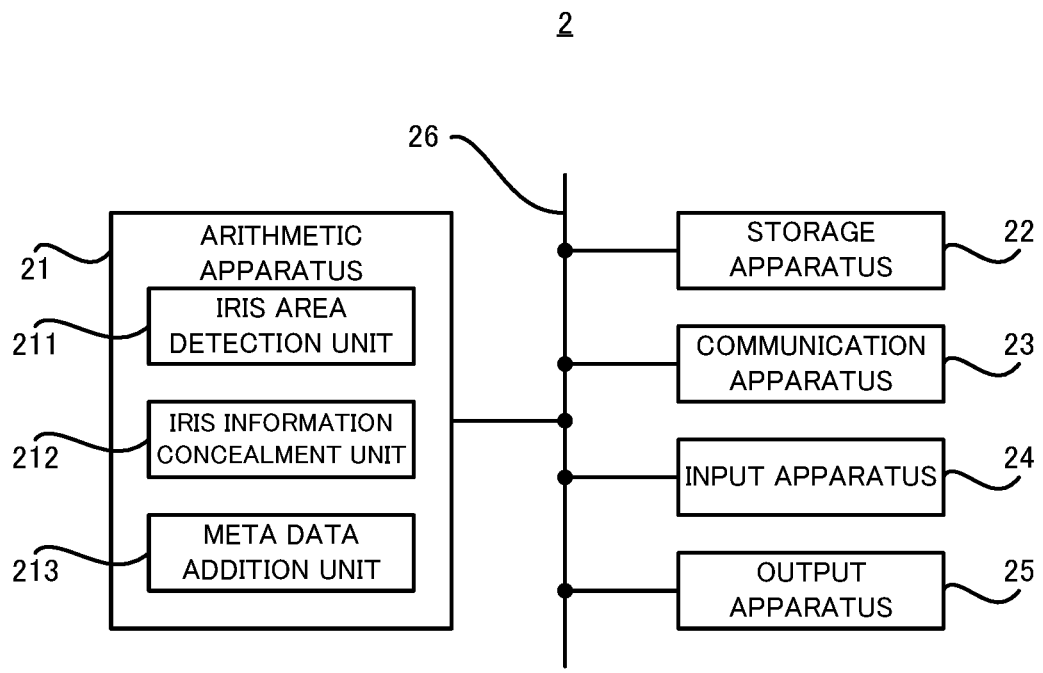
FIG. 2 is a block diagram that illustrates a configuration of an image processing apparatus in a second example embodiment.

Firstly, with reference to FIG. 2, a configuration of the image processing apparatus 2 in the second example embodiment will be described. FIG. 2 is a block diagram that illustrates the configuration of the image processing apparatus 2 in the second example embodiment. Note that detailed description of the component that is already described is omitted by assigning the same reference number thereto.

As illustrated in FIG. 2, the image processing apparatus 2 includes an arithmetic apparatus 21 and a storage apparatus 22. Furthermore, the image processing apparatus 2 may include a communication apparatus 23, an input apparatus 24 and an output apparatus 25. However, the image processing apparatus 2 may not include at least one of the communication apparatus 23, the input apparatus 24 and the output apparatus 25. The arithmetic apparatus 21, the storage apparatus 22, the communication apparatus 23, the input apparatus 24 and the output apparatus 25 may be interconnected through a data bus 26.

The arithmetic apparatus 21 includes at least one of a CPU (Central Processing Unit), a GPU (Graphic Processing Unit) and a FPGA (Field Programmable Gate Array), for example. The arithmetic apparatus 21 reads a computer program. For example, the arithmetic apparatus 21 may read a computer program that is stored in the storage apparatus 22. For example, the arithmetic apparatus 21 may read a computer program that is stored in a non-transitory computer-readable recording medium by using a non-illustrated recording medium reading apparatus (for example, the below described input apparatus) of the image processing apparatus 2. The arithmetic apparatus 21 may obtain (namely, download or read) a computer program from a non-illustrated apparatus that is placed outside the image processing apparatus 2 through the communication apparatus 23 (alternatively, other communication apparatus) The arithmetic apparatus 21 executes the read computer program. As a result, a logical functional block for performing an operation that should be performed by the image processing apparatus 2 is implemented in the arithmetic apparatus 21. Namely, the arithmetic apparatus 21 is configured to serve as a controller for implementing the logical functional block for performing the operation (in other words, a processing) that should be performed by the image processing apparatus 2.

In the second example embodiment, the image processing apparatus 2 performs a personal information protection operation for protecting a personal information of the target person included in the person image IMG1. In the second example embodiment, the person image IMG1 is an image in which at least the eye of the target person is included. In this case, the image processing apparatus 2 performs the personal information protection operation for protecting an iris information relating the iris of the target person included in the person image IMG1 as one example of the personal information of the target person. In other words, the image processing apparatus 2 performs the personal information protection operation for preventing the abuse of the iris information relating the iris of the target person included in the person image IMG1 as one example of the personal information of the target person.

FIG. 2 illustrates one example of the logical functional block that is implemented in the arithmetic apparatus 21 for performing the personal information protection operation.

As illustrated in FIG. 2, in the arithmetic apparatus 21, an iris area detection unit 211 that is one specific example of "a detecting unit", an iris information concealment unit 212 that is one specific example of "an image processing unit" and a meta data addition unit 213 that is one specific example of "an adding unit" are implemented. However, in the second example embodiment, the meta data addition unit 213 may not be implemented in the arithmetic apparatus 21. Note that a detail of an operation of each of the iris area detection unit 211, the iris information concealment unit 212 and the meta data addition unit 213 will be described later in detail with reference to FIG. 3 and so on.

The storage apparatus 22 is configured to store a desired data. For example, the storage apparatus 22 may temporarily store the computer program that is executed by the arithmetic apparatus 21. The storage apparatus 22 may temporarily store a data that is temporarily used by the arithmetic apparatus 21 when the arithmetic apparatus 21 executes the computer program. The storage apparatus 22 may store a data that is stored for a long term by the image processing apparatus 2. Note that the storage apparatus 22 may include at least one of a RAM (Random Access Memory), a ROM (Read Only Memory), a hard disk apparatus, a magneto-optical disc, a SSD (Solid State Drive) and a disk array apparatus. Namely, the storage apparatus 22 may include a non-transitory recording medium.

The communication apparatus 23 is configured to communicate with an apparatus outside the image processing apparatus 2 through a not-illustrated communication network.

The input apparatus 24 is an apparatus that receives an input of an information from an outside of the image processing apparatus 2 to the image processing apparatus 2. For example, the input apparatus 24 may include an operational apparatus (for example, at least one of a keyboard, a mouse and a touch panel) that is operable by an operator of the image processing apparatus 2. For example, the input apparatus 24 may include a reading apparatus that is configured to read an information recorded as a data in a recording medium that is attachable to the image processing apparatus 2.

The output apparatus 25 is an apparatus that outputs an information to an outside of the image processing apparatus 2. For example, the output apparatus 25 may output the information as an image. Namely, the output apparatus 25 may include a display apparatus (what we call a display) that is configured to display the image representing the information to be outputted. For example, the output apparatus 25 may output the information as a sound. Namely, the output apparatus 25 may include an audio apparatus (what we call a speaker) that is configured to output the sound. For example, the output apparatus 25 may output the information on a paper. Namely, the output apparatus 25 may include a print apparatus (what we call a printer) that is configured to print a desired information on the paper.

(2-2) Personal Information Protection Operation Performed by Image Processing Apparatus 2

Figure 3:
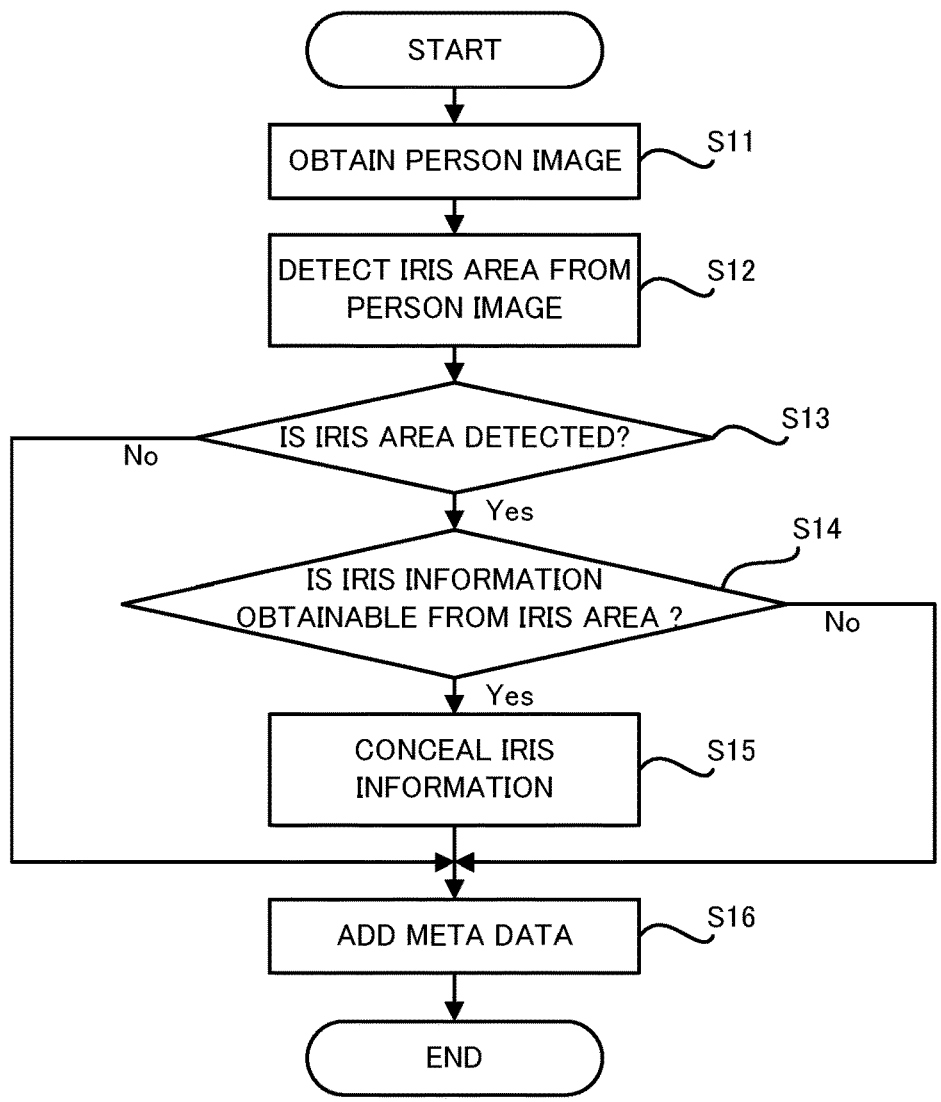
FIG. 3 is a flow chart that illustrates a flow of a personal information protection operation that is performed by the image processing apparatus in the second example embodiment.

Next, with reference to FIG. 3, the personal information protection operation that is performed by the image processing apparatus 2 in the second example embodiment will be described. FIG. 3 is a flowchart that illustrates a flow of the personal information protection operation that is performed by the image processing apparatus 2 in the second example embodiment.

As illustrated in FIG. 3, the iris area detection unit 211 obtains the person image IMG1 in which at least the eye of the target person is included (a step S11). For example, the iris area detection unit 211 may obtain the person image IMG1 from an imaging apparatus (namely, a camera) that generates the person image IMG1 by capturing an image of the target person. For example, when the person image IMG1 is stored in the storage apparatus 22, the iris area detection unit 211 may obtain the person image IMG1 from the storage apparatus 25. For example, when the person image IMG1 is stored in the recording medium that is attachable to the image processing apparatus 2, the iris area detection unit 211 may obtain the person image IMG1 from the recording medium by using the recording medium reading apparatus (for example, the input apparatus 24) of the image processing apparatus 2. For example, when the person image IMG1 is stored in the apparatus (for example, a cloud server) outside the image processing apparatus 2, the iris area detection unit 211 may obtain the person image IMG1 from the outside apparatus by using the communication apparatus 23.

Figure 4:
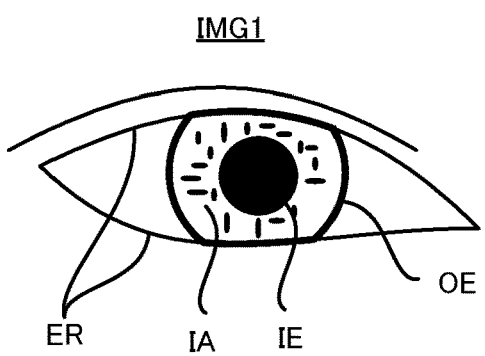
FIG. 4 illustrates an iris area.

Then, the iris area detection unit 211 detects an iris area IA including the iris of the target person from the person image IMG1 (a step S12). One example of the iris area IA is illustrated in FIG. 4. As illustrated in FIG. 4, the iris area IA includes a loop-shaped (in other words, a doughnut-shaped) area that is surrounded by an outer edge (namely, an outer outline) OE of the iris and an inner edge (namely, an inner outline) IE of the iris. Thus, the iris area detection unit 211 may detect the iris area IA by detecting a feature point relating to the outer edge OE of the iris and a feature point relating to the inner edge IE of the iris from the person image IMG1. Note that an outer edge of a pupil may be used as the inner edge IE of the iris.

The iris is included in the eye of the target person. Thus, the iris area detection unit 212 may detect an eye area including the eye of the target person from the person image IMG1 and detect the iris area IA from the detected eye area, instead of directly detecting the iris area IA from the person image IMG1. The eye area may be an area that has a predetermined shape (for example, a rectangular shape) and that includes both eyes of the target person.

The iris is included in a face of the target person. Thus, the iris area detection unit 212 may detect a face area including the face of the target person from the person image IMG1 and detect the iris area IA from the detected face area, instead of directly detecting the iris area IA from the person image IMG1. Alternatively, the iris area detection unit 212 may further detect the eye area from face area and detect the iris area IA from the detected eye area.

As illustrated in FIG. 4, a part of the iris is hidden by an eyelid sometimes. In this case, the iris area detection unit 211 may detect an edge ER of the eyelid from the person image IMG1 and delete an area part that is hidden by the eyelid from the loop-shaped iris area IA based on the detected edge ER of the eyelid. In this case, the iris area IA may be an area that is surrounded by the outer edge OE of the iris, the inner edge IE of the iris and the edge ER of the eyelid.

Again in FIG. 3, then, the iris area detection unit 211 determines whether or not the iris area IA is detected from the person image IMG1 at the step S12 (a step S13). Namely, the iris area detection unit 211 determines whether or not the iris of the target person is included in the person image IMG1 obtained at the step S11.

As a result of the determination at the step S13, when it is determined that the iris area IA is not detected at the step S12 (namely, the iris of the target person is not included in the person image IMG1) (the step S13: No), it is assumed that a necessity for protecting the iris information relating to the iris of the target person is low. In this case, the image processing apparatus 2 may ends the personal information protection operation illustrated in FIG. 3. Then, the image processing apparatus 2 may perform the personal information protection operation illustrated in FIG. 3 again when new person image IMG1 is obtained.

When the iris area IA is not detected from the person image IMG1, the meta data addition unit 213 may add (in other words, insert), to the person image IMG1, meta data indicating that the iris area IA is not detected from the person image IMG1 (namely, the iris of the target person is not included in the person image IMG1) (a step S16). For example, when the person image IMG1 is an image based on an Exif (Exchangeable image file format), the meta data addition unit 213 may add, to the person image IMG1, the meta data indicating that the iris area IA is not detected from the person image IMG1 as a part of meta data based on the Exif. In this case, the target person can recognize that a user that uses the person image IMG1 cannot abuse the iris information of the target person by referring to the meta data that is added to the person image IMG1. Thus, the target person can achieve a feeling of safety that the abuse of the iris information of the target person is prevented.

On the other hand, as a result of the determination at the step S13, when it is determined that the iris area IA is detected at the step S12 (namely, the iris of the target person is included in the person image IMG1) (the step S13: Yes), the iris information concealment unit 212 determines whether or not the iris information relating to the iris of the target person is obtainable from the iris area IA.

The iris information may include an information relating to a pattern of the iris, for example. The pattern of the iris is used for an iris authentication that authenticates the target person by using the iris, for example. Thus, when the information relating to the pattern of the iris of the target person is abused by the user (especially, the user having the malicious intent) that is different from the target person, there is a possibility that it is erroneously determined by the iris authentication that the user that is different from the target person is the target person. Namely, there is a possibility that the user that is different from the target person pretends to be the target person. Thus, an iris pattern information may be the personal information that is preferable to be protected by the personal information protection operation.

The iris information concealment unit 212 may determine whether or not the iris information is obtainable from the iris area IA by determining whether or not the pattern of the iris is determinable from the iris area IA (namely, from the person image IMG1 including the iris area IA). In this case, the iris information concealment unit 212 may determine that the iris information is obtainable from the iris area IA when the pattern of the iris is determinable from the iris area IA. Alternatively, the iris information concealment unit 212 may determine that the iris information is not obtainable from the iris area IA when the pattern of the iris is not determinable from the iris area IA.

Especially, the iris information concealment unit 212 may determine whether or not the iris information is obtainable from the iris area IA by determining whether or not the pattern of the iris is determinable from the iris area IA so accurately that the iris authentication can be performed. In this case, the iris information concealment unit 212 may determine that the iris information is obtainable from the iris area IA when the pattern of the iris is determinable from the iris area IA so accurately that the iris authentication can be performed. Alternatively, the iris information concealment unit 212 may determine that the iris information is not obtainable from the iris area IA when an accuracy of the pattern of the iris is too low to perform the iris authentication although the pattern of the iris is determinable. Of course, the iris information concealment unit 212 may determine that the iris information is not obtainable from the iris area IA when the pattern of the iris is not determinable from the iris area IA.

Determining the pattern of the iris from the iris area IA is more difficult as a resolution of the iris area IA (namely, a resolution of the person image IMG1) is lower. Conversely, determining the pattern of the iris from the iris area IA is easier as the resolution of the iris area IA is higher. Thus, the iris information concealment unit 212 may determine whether or not the iris information is obtainable from the iris area IA by determining whether or not the resolution of the iris area IA is higher than a predetermined first threshold value. In this case, the iris information concealment unit 212 may determine that the iris information is obtainable from the iris area IA when the resolution of the iris area IA is higher than the first threshold value. On the other hand, the iris information concealment unit 212 may determine that the iris information is not obtainable from the iris area IA when the resolution of the iris area IA is lower than the first threshold value. Note that the first threshold value may be set to be a proper value that is capable of distinguishing the resolution of the iris area IA that allows the pattern of the iris to be determined from the iris area IA from the resolution of the iris area IA that does not allow the pattern of the iris to be determined from the iris area IA.

Determining the pattern of the iris from the iris area IA is more difficult as a size of the iris area IA (typically, a total number of pixels included in the iris area IA) is smaller. Conversely, determining the pattern of the iris from the iris area IA is easier as the size of the iris area IA is larger. Thus, the iris information concealment unit 212 may determine whether or not the iris information is obtainable from the iris area IA by determining whether or not the size of the iris area IA is larger than a predetermined second threshold value. In this case, the iris information concealment unit 212 may determine that the iris information is obtainable from the iris area IA when the size of the iris area IA is larger than the second threshold value. On the other hand, the iris information concealment unit 212 may determine that the iris information is not obtainable from the iris area IA when the size of the iris area IA is smaller than the second threshold value. Note that the second threshold value may be set to be a proper value that is capable of distinguishing the size of the iris area IA that allows the pattern of the iris to be determined from the iris area IA from the size of the iris area IA that does not allow the pattern of the iris to be determined from the iris area IA.

As a result of the determination at the step S14, when it is determined that the iris information is not obtainable from the iris area IA (the step S14: No), it is assumed that the necessity for protecting the iris information is low, because the user cannot obtain the iris information. In this case, the image processing apparatus 2 may ends the personal information protection operation illustrated in FIG. 3. Then, the image processing apparatus 2 may perform the personal information protection operation illustrated in FIG. 3 again when new person image IMG1 is obtained.

When the iris information is not obtainable from the iris area IA, the meta data addition unit 213 may add (in other words, insert), to the person image IMG1, meta data indicating that the iris information is not obtainable from the person image IMG1 (the step S16). For example, when the person image IMG1 is the image based on the Exif, the meta data addition unit 213 may add, to the person image IMG1, the meta data indicating that the iris information is not obtainable from the person image IMG1 as a part of meta data based on the Exif. In this case, the target person can recognize that the user that uses the person image IMG1 cannot abuse the iris information of the target person by referring to the meta data that is added to the person image IMG1. Thus, the target person can achieve the feeling of safety that the abuse of the iris information of the target person is prevented.

On the other hand, as a result of the determination at the step S14, when it is determined that the iris information is obtainable from the iris area IA (the step S14: Yes), there is a possibility that the user that uses the person image IMG1 abuses the iris information obtained from the person image IMG1. Thus, it is assumed that the necessity for protecting the iris information is high. Thus, in this case, the iris information concealment unit 212 conceals the iris information so that the iris information is not obtainable from the iris area IA (a step S15). In the second example embodiment, the iris information concealment unit 212 converts the person image IMG1 in which the iris information is obtainable from the iris area IA to a protected image IMG2 in which the iris information is not obtainable from the iris area IA in order to conceal the iris information. Namely, the iris information concealment unit 212 converts the person image IMG1 in which the iris information is not concealed to the protected image IMG2 in which the iris information is concealed. In this case, not the person image IMG1 but the protected image IMG2 is provided to the user that uses the person image IMG1. As a result, the user that uses the protected image IMG2 cannot obtain the iris information from the protected image IMG2. Thus, the user cannot abuse the iris information of the target person included in the person image IMG1.

The iris information concealment unit 212 may convert the person image IMG1 to the protected image IMG2 by performing an image processing on at least a part of the iris area IA of the person image IMG1. The image processing includes an image processing for concealing the iris information. As described above, in the second example embodiment, the iris information concealment unit 212 conceals the iris information by converting the person image IMG1 to the protected image IMG2. Thus, the image processing includes an image processing for converting the person image IMG1 in which the iris information is obtainable from the iris area IA to the protected image IMG2 in which the iris information is not obtainable from the iris area IA.

Next, one example of the image processing that is performed by the iris information concealment unit 212 will be described. However, the image processing that is performed by the iris information concealment unit 212 is not limited to an image processing described below. The iris information concealment unit 212 may not perform the image processing described below. The iris information concealment unit 212 may perform an image processing that is different from the image processing described below.

Figure 5:
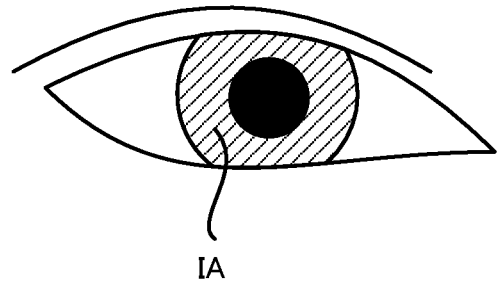
FIG. 5 illustrates the iris area that is filled with a predetermined color.

The image processing may include a processing for filling at least a part of the iris area IA with a predetermined color, as illustrated in FIG. 5. For example, the iris information concealment unit 212 may convert the person image IMG1 in which the iris area IA is not filled with the predetermined color to the protected image IMG2 in which at least a part of the iris area IA is filled with the predetermined color by filling at least a part of the iris area IA of the person image IMG1 with the predetermined color. As a result, the pattern of the iris included in the person image IMG1 is filled with the predetermined color in the protected image IMG2. Thus, the use that uses the protected image IMG2 cannot obtain the iris information from the protected image IMG2.

The predetermined color may be any color. When a color that is greatly different from an original color of the iris is used as the predetermined color, there is a possibility that the target person or the user feels a feeling of strangeness to the iris included in the protected image IMG2 (namely, the iris area IA that is filled with the predetermined color), compared to a case where a color that is similar to the original color of the iris is used as the predetermined color. Thus, a color that is less likely to bring the feeling of strangeness to the target person or the user may be used as the predetermined color. For example, a base color (in other words, a basis color) of the iris included in the person image IMG1 may be used as the predetermined color. The base color of the iris may be a color that corresponds to a median value in a color histogram of the iris. As a result, the iris information concealment unit 212 is capable of generating the protected image IMG2 to which the target person or the user is less likely to feel the feeling of strangeness. Namely, the iris information concealment unit 212 is capable of generating the protected image IMG2 in which an appearance of the iris is natural (in other words, is not unnatural excessively).

The image processing may include a processing for superimposing a predetermined superimposed pattern on at least a part of the iris area IA that is filled with the predetermined color. The iris area IA in the person image IMG1 is generally not an area that is colored with a single color but an area that is colored with a certain color and that includes the pattern of the iris. Thus, when the superimposed pattern is not superimposed on at least a part of the iris area IA that is filled with the predetermined color, there is a higher possibility that the target person or the user feels the feeling of strangeness to the iris included in the protected image IMG2 (namely, the iris area IA that is filled with the predetermined color and on which the predetermined pattern is not superimposed), compared to a case where the superimposed pattern is superimposed on at least a part of the iris area IA that is filled with the predetermined color. Conversely, when the superimposed pattern is superimposed on at least a part of the iris area IA that is filled with the predetermined color, there is a lower possibility that the target person or the user feels the feeling of strangeness to the iris included in the protected image IMG2 (namely, the iris area IA that is filled with the predetermined color and on which the predetermined pattern is superimposed), compared to a case where the superimposed pattern is not superimposed on at least a part of the iris area IA that is filled with the predetermined color. Therefore, the iris information concealment unit 212 is capable of generating the protected image IMG2 to which the target person or the user is less likely to feel the feeling of strangeness by superimposing the superimposed pattern on at least a part of the iris area IA that is filled with the predetermined color. Namely, the iris information concealment unit 212 is capable of generating the protected image IMG2 in which the appearance of the iris is natural (in other words, is not unnatural excessively).

Figure 6A:
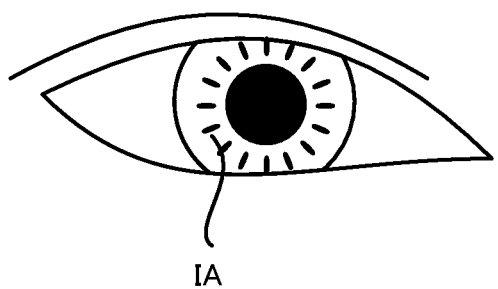
FIG. 6 Each of FIG. 6A to FIG. 6D illustrates the iris area on which a superimposed patten is superimposed.
Figure 6C:
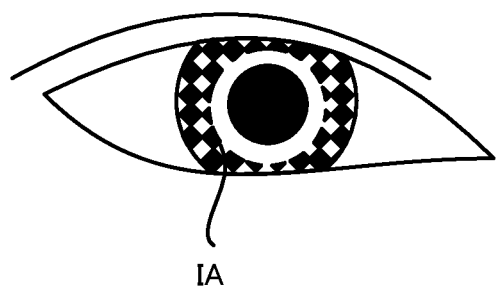
Figure 6B:
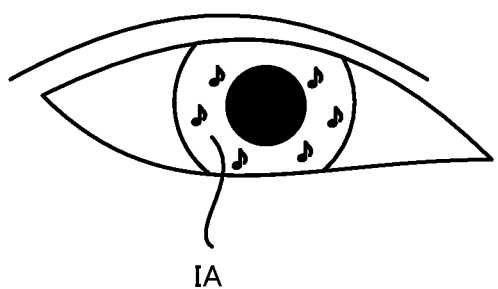

The superimposed pattern may include a first pseud pattern that is different from the pattern of the iris but imitates the pattern of the iris. For example, as illustrated in FIG. 6A, the first pseud pattern may include a radial pattern that includes a plurality of lines extending radially from the pupil. For example, as illustrated in FIG. 6B, the first pseud pattern may include an artificial pattern that is seemingly similar to a line of the pattern of the iris but actually has a shape that is different from that of the line of the pattern of the iris. FIG. 6B illustrates an example in which the first pseud pattern includes the artificial pattern in which musical notes are arranged as if they are the lines of the pattern of the iris.

Figure 6D:
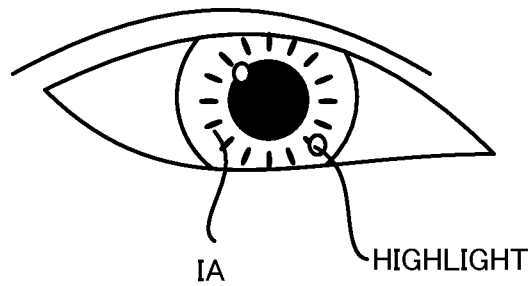

The superimposed pattern may include a second pseud pattern that is not the pattern of the iris itself but imitates a pattern that is assumed to appear on (in other words, to be included on) the iris. For example, when a certain person wears a contact lens (for example, a colored contact lens) on which some colored pattern is formed, a pattern that corresponds to the colored pattern formed on the contact lens is assumed to appear on the iris of this person. Thus, as illustrated in FIG. 6C, the second pseud pattern may include the colored pattern that is formed on the contact lens. Moreover, when the eye of a certain person is illuminated with a light, a reflection pattern that corresponds to a reflected light from the iris is assumed to appear on the iris of this person. Thus, as illustrated in FIG. 6D, the second pseud pattern may include a noise pattern that imitates the reflection pattern (what we call a highlight) corresponding to the reflected light from the iris. Moreover, there is a possibility that a scenery around a certain person is included in the iris of this person. Thus, the second pseud pattern may include a scenery pattern that imitates the scenery included in the iris.

The feeling of strangeness which the target person or the user feels to the iris area IA that is filled with the predetermined color becomes larger as the size of the iris area IA becomes larger. This is because the filled iris area IA is more noticeable as the size of the iris area IA become larger. Conversely, the feeling of strangeness which the target person or the user feels to the iris area IA that is filled with the predetermined color becomes smaller as the size of the iris area IA becomes smaller. This is because the filled iris area IA is more unnoticeable as the size of the iris area IA become smaller. Thus, the iris information concealment unit 212 may superimpose the superimposed pattern on at least a part of the iris area IA when the size of the iris area IA is larger than a predetermined third threshold value. On the other hand, the iris information concealment unit 212 may not superimpose the superimposed pattern on at least a part of the iris area IA when the size of the iris area IA is smaller than the predetermined third threshold value. Note that the third threshold value may be set to be a proper value that is capable of distinguishing a state where the size of the iris area IA is so large that the target person or the user feels the feeling of strangeness to the iris area IA that is filled with the predetermined color from a state where the size of the iris area IA is not so large that the target person or the user feels the feeling of strangeness to the iris area IA that is filled with the predetermined color.

Again in FIG. 3, when the iris information is concealed, the meta data addition unit 213 may add (in other words, insert), to the protected image IMG2, meta data indicating that the iris information is concealed in the protected image IMG2 (the step S16). Namely, when the image processing for concealing the iris information is performed on the person image IMG1, the meta data addition unit 213 may add the meta data as a processing information relating to the image processing performed on the person image IMG1. For example, when the protected image IMG2 is the image based on the Exif, the meta data addition unit 213 may add, to the protected image IMG2, the meta data indicating that the iris information is concealed in the protected image IMG2 as a part of meta data based on the Exif.

The user cannot obtain the iris information from the protected image IMG2 in which the iris information is concealed. Thus, the meta data indicating that the iris information is concealed in the protected image IMG2 may be regarded to be equivalent to meta data indicating that the iris information is not obtainable from the protected image IMG2. Moreover, the iris information concealment unit 212 conceals the iris information by performing the image processing on at least a part of the iris area IA. Thus, the meta data indicating that the iris information is concealed in the protected image IMG2 may be regarded to be equivalent to meta data indicating that the image processing (especially, the image processing for concealing the iris information) is performed on the iris area IA of the protected.

(2-3) Technical Effect of Image Processing Apparatus 2

As described above, the image processing apparatus 2 converts the person image IMG1 in which the iris information is not concealed to the protected image IMG2 in which the iris information is concealed. Thus, the user cannot obtain the iris information from the iris area IA of the protected image IMG2 when not the person image IMG1 but the protected image IMG2 is used by the user. As a result, the abuse of the iris information is prevented. Namely, the image processing apparatus 2 in the second example embodiment is capable of solving the above described first technical problem, as with the image processing apparatus in the first example embodiment.

On the other hand, there is a possibility that it is not easy to seemingly distinguish the protected image IMG2 from the person image IMG1, depending on a detail of the image processing that is performed on at least a part of the iris area IA of the person image IMG1. In this case, when the eye of the target person himself is included in an image that is not easy to be seemingly distinguished from the person image IMG1 or the protected image IMG2, a second technical problem that it is not easy for the target person to recognize whether or not the abuse of the iris information is prevented occurs. However, the image processing apparatus 2 in the second example embodiment adds, to the protected image IMG2, the meta data indicating that the image processing is performed on at least a part of the iris area IA. Namely, the image processing apparatus 2 add, to the protected image IMG2, the meta data indicating that the iris information is concealed in the protected image IMG2. Thus, when this meta data is added to the image in which the iris of the target person is included, the target person can recognize that this image is the protected image IMG2 in which the iris information is not obtainable from the iris area IA by checking the meta data. As a result, the target person can achieve the feeling of safety that the abuse of the iris information of the target person is prevented. Namely, the image processing apparatus 2 in the second example embodiment is capable of solving the second technical problem.

A scene in which the person image IMG1 is uploaded to a server that provides a service in which a large number of unspecified users are allowed to use the image (for example, a SNS (Social Network Service)) is one example of a scene in which the iris information is concealed. In this case, the image processing apparatus 2 may conceal the iris information by performing the above descried personal protection operation before the person image IMG1 is uploaded to the above described server. Alternatively, the image processing apparatus 2 may conceal the iris information by performing the above descried personal protection operation at a timing at which the person image IMG1 that is expected to be uploaded to the server is generated (for example, at a timing at which the imaging apparatus captures the image of the target person). In this case, not the person image IMG1 but the protected image IMG2 is uploaded to the server. Anyway, the image processing apparatus 2 may conceal the iris information by performing the above descried personal protection operation before the person image IMG1 is used by the user.

Furthermore, the user that intends to abuse the iris information relating to the iris included in the protected image IMG2 can recognize by checking the meta data that the iris information cannot be abused. As a result, the meta data substantially serves as a deterrent force that deters the abuse of the iris information by the user.

Furthermore, the image processing apparatus 2 is capable of concealing the iris information by filling at least a part of the iris area IA with the predetermined color. As a result, the image processing apparatus 2 is capable of concealing the iris information relatively easily without performing the complicated image processing.

Furthermore, the image processing apparatus 2 is capable of superimposing the superimposed pattern on at least a part of the iris area IA that is filled with the predetermined color. As a result, the image processing apparatus 2 is capable of generating the protected image IMG2 to which the target person or the user is less likely to feel the feeling of strangeness. Namely, the image processing apparatus 2 is capable of generating the protected image IMG2 in which the appearance of the iris is natural (in other words, is not unnatural excessively).

Note that there is a possibility that the user that intends to abuse the iris information obtains, as the iris information, an information relating to the superimposed pattern from the iris area IA on which the superimposed pattern is superimposed. Even in this case, an iris authentication apparatus that performs the iris authentication does not usually determine that the user is same as a specified person, because the pattern of the iris that is same as the superimposed pattern is not registered in a database for matching. Namely, there is little possibility that the iris authentication of the user that obtain the information relating to the superimposed pattern as the iris information accidentally succeeds. This is because the superimposed pattern is absolutely an artificial pattern and is not the pattern of the iris of the actual person. However, the information relating to the superimposed pattern may be registered in the database for matching. In this case, the iris authentication apparatus determines that the pattern (namely, the superimposed pattern) indicated by the iris information that is provided from the user that obtains the information relating to the superimposed pattern as the iris information is same as the superimposed pattern registered in the database for matching. In this case, the iris authentication apparatus may determine that the user that obtains the information relating to the superimposed pattern as the iris information is the user that intends to abuse the iris information.

(2-4) Scene in which Image Processing Apparatus 2 is Used

Next, one example of a scene in which the image processing apparatus 2 is used will be described.

(2-4-1) First Scene in which Image Processing Apparatus 2 is Used

The image processing apparatus 2 may be adapted to the camera (namely, the imaging apparatus) that generates the person image IMG1 by capturing the image of the target person. Namely, the image processing apparatus 2 may be installed to the camera.

In this case, the image processing apparatus 2 may determine whether or not the above described personal information protection operation is performed before the camera captures the image of the target person (for example, the user presses a shutter button of the camera). For example, when a user of the camera requests that the personal information protection operation is performed, the image processing apparatus 2 may determine that the above described personal information protection operation is performed. For example, when the user of the camera does not request that the personal information protection operation is performed, the image processing apparatus 2 may determine that the above described personal information protection operation is not performed. In this case, the image processing apparatus 2 may notify the user of the camera of an information whether or not the personal information protection operation is performed by using the output apparatus 25. The image processing apparatus 2 may display at least one of a message and an icon for notifying the user of the camera of the information whether or not the personal information protection operation is performed by using the display (for example, the display of the camera) that is one example of the output apparatus 25.

When the personal information protection operation is performed, the image processing apparatus 2 may automatically (namely, without requiring an instruction from the user) perform the personal information protection operation at a timing at which the camera generates the person image IMG1 (for example, at a timing at which the camera captures the image of the target person). Alternatively, the image processing apparatus 2 may not perform the personal information protection operation at the timing at which the camera generates the person image IMG1 and may perform the personal information protection operation at a timing at which the camera outputs the person image IMG1 to another apparatus (namely, an apparatus outside the camera).

(2-4-2) Second Scene in which Image Processing Apparatus 2 is Used

The image processing apparatus 2 may be adapted to a smartphone (alternatively, a tablet terminal, and what we call a mobile information terminal) of the target person (alternatively, another person that captures the image of the target person). Namely, the image processing apparatus 2 may be installed to the smartphone. Especially, the image processing apparatus 2 may be installed to the smartphone that includes the camera.

In this case, the image processing apparatus 2 may determine whether or not the above described personal information protection operation is performed before the camera captures the image of the target person, as with a case where the image processing apparatus 2 is installed to the camera. The image processing apparatus 2 may notify a user (namely, the target person or another person) of the smartphone of the information whether or not the personal information protection operation is performed by using the output apparatus 25.

When the personal information protection operation is performed, the image processing apparatus 2 may automatically (namely, without requiring an instruction from the user) perform the personal information protection operation at a timing at which the smartphone generates the person image IMG1, as with a case where the image processing apparatus 2 is installed to the camera. The image processing apparatus 2 may perform the personal information protection operation at a timing at which the smartphone outputs the person image IMG1 to another apparatus (namely, an apparatus outside the smartphone). As one example, the image processing apparatus 2 may perform the personal information protection operation at a timing at which the smartphone uploads the person image IMG1 to an external server (for example, the server that provides the service in which a large number of unspecified users are allowed to use the image (for example, the SNS) described above).

(2-4-3) Third Scene in which Image Processing Apparatus 2 is Used

The image processing apparatus 2 may be adapted to a client terminal in a client-server system. The above described smartphone is one example of the client terminal. An information processing apparatus such as a personal computer that is configured to communicate with a server is another example of the client terminal. The image processing apparatus 2 that is adapted to the client terminal may perform the personal information protection operation at at least one of the timing at which the smartphone generates the person image IMG1 or the timing at which the smartphone outputs the person image IMG1 to another apparatus, as with the image processing apparatus 2 is adapted to the smartphone.

Alternatively, the image processing apparatus 2 may be adapted to a sever in the client-server system. The server that provides the service in which a large number of unspecified users are allowed to use the image (for example, the SNS) described above is one example of the server. The image processing apparatus 2 may perform the personal information protection operation at a timing at which the person image IMG1 is obtained from the client terminal. The image processing apparatus 2 may perform the personal information protection operation at a timing at which a process for publishing the person image IMG1, which is obtained from the client terminal, to a large number of unspecified users (for example, for storing the personal image IMG1 in a web server and the like) is performed. As a result, even when the personal information protection operation is not performed by the client terminal, an effect that is same as the above described effect can be achieved because the personal information protection operation is performed by the server.

(3) Third Example Embodiment

Next, a third example embodiment of the image processing apparatus, the image processing method and the recording medium will be described. In the below described description, the third example embodiment of the image processing apparatus, the image processing method and the recording medium will be described by using an image processing apparatus 3 to which the third example embodiment of the image processing apparatus, the image processing method and the recording medium is adapted.

The image processing apparatus 3 in the third example embodiment is different from the image processing apparatus 2 in the second example embodiment in that the iris information concealment unit 212 may estimate a state of a light source when the noise pattern that imitates the reflection pattern (what we call the highlight) corresponding to the reflection light from the iris is superimposed on at least a part of the iris area IA. Another feature of the image processing apparatus 3 may be same as another feature of the image processing apparatus 2.

Specifically, the iris information concealment unit 212 may estimate the state of the light source of the light with which the target person included in the person image IMG1 is illuminated based on a brightness of the person image IMG1. The light source may include an illumination apparatus that illuminates the target person with an illumination light. The light source may include a sum that substantially illuminates the target person with an environment light.

The state of the light source may include a position (for example, a relative position relative to the target person) of the light source. In this case, the iris information concealment unit 212 may estimate the position of the light source based on a magnitude relationship among the brightnesses of a plurality of pixels of the person image IMG1. Note that the position of the light source may be regarded to be equivalent to a direction (a relative direction relative to the target person) of the light source, because a direction along which the light from the light source propagates (namely, a direction along which the light source illuminates the target person with the light) changes depending on the position of the light source. Namely, an operation for estimating the position of the light source may be regarded to be equivalent to an operation for estimating the direction of the light source.

Figures 7A, 7B:
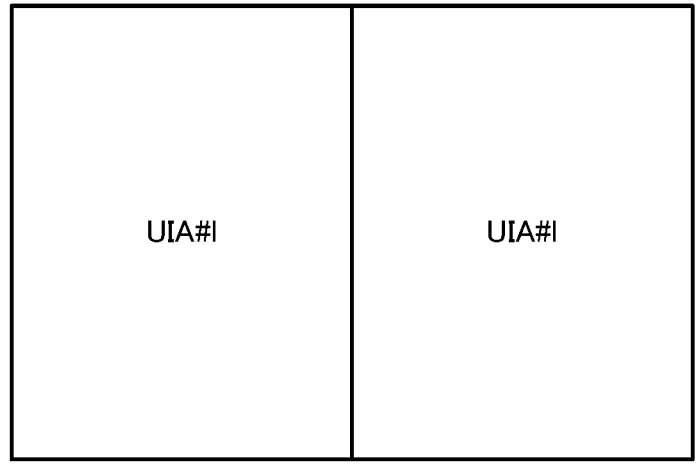
FIG. 7 Each of FIG. 7A to FIG. 7B illustrates a plurality of unit image areas that are obtained by dividing a person image.

As one example, as illustrated in FIG. 7A, the iris information concealment unit 22 may divide the person image IMG1 into two unit image areas UIA that are arranged along a horizontal direction. FIG. 7A illustrates an example in which the person image IMG1 is divided into a unit image area UIA #L that corresponds to a left area of the person image IMG1 and a unit image area UIA #R that corresponds to a right area of the person image IMG1.

As another example, as illustrated in FIG. 7B, the iris information concealment unit 22 may divide the person image IMG1 into a plurality of unit image areas UIA. FIG. 7B illustrates an example in which the person image IMG1 is divided into nine unit image areas UIA (specifically, unit image areas UIA #1 to UIA #9). The unit image area UIA #1 corresponds to an upper left area of the person image IMG1, the unit image area UIA #2 corresponds to an upper center area of the person image IMG1, the unit image area UIA #3 corresponds to an upper right area of the person image IMG1, the unit image area UIA #4 corresponds to a middle left area of the person image IMG1, the unit image area UIA #5 corresponds to a middle center area of the person image IMG1, the unit image area UIA #6 corresponds to a middle right area of the person image IMG1, the unit image area UIA #7 corresponds to a lower left area of the person image IMG1, the unit image area UIA #8 corresponds to a lower center area of the person image IMG1, and the unit image area UIA #9 corresponds to a lower right area of the person image IMG1.

Then, the iris information concealment unit 212 may estimate the position of the light source based on the magnitude relationship among the plurality of unit image areas UIA. Specifically, the iris information concealment unit 212 may estimate, as the position of the light source, a position that corresponds to at least one unit image area UIA the brightness of which is relatively high among the plurality of unit image areas UIA. The iris information concealment unit 212 may estimate that the light source is located at a direction at which at least one unit image area UIA the brightness of which is relatively high among the plurality of unit image areas UIA is located.

For example, in an example illustrated in FIG. 7A, when the brightness of the unit image area UIA #R is lower than the brightness of the unit image area UIA #L, it is estimated that the light source is more likely to illuminate the target person with the light from a direction at which the unit image area UIA #L is located (namely, a left side direction). Therefore, in this case, the iris information concealment unit 212 may estimate that the light source is located at a position that is leftward from the center of the person image IMG1.

For example, in an example illustrated in FIG. 7B, when (i) the brightnesses of the unit image areas UIA #3, UIA #6 and UIA #9 are about same, (ii) the brightnesses of the unit image areas UIA #2, UIA #5 and UIA #8 are lower than the brightnesses of the unit image areas UIA #3, UIA #6 and UIA #9 and (iii) the brightnesses of the unit image areas UIA #1, UIA #4 and UIA #7 are lower than the brightnesses of the unit image areas UIA #2, UIA #5 and UIA #8, it is estimated that the light source is more likely to illuminate the target person with the light from a direction at which the unit image areas UIA #3, UIA #6 and UIA #9 are located (namely, a right side direction). Therefore, in this case, the iris information concealment unit 212 may estimate that the light source is located at a position that is rightward (especially, just rightward) from the center of the person image IMG1. Moreover, in the example illustrated in FIG. 7B, when the brightness of the unit image area UIA #3 is the highest and the brightness of the unit image area UIA #7 is the lowest, it is estimated that the light source is more likely to illuminate the target person with the light from a direction at which the unit image area UIA #3 (namely, an upper right side direction). Therefore, in this case, the iris information concealment unit 212 may estimate that the light source is located at a position that is rightward and upward from the center of the person image IMG1.

Figure 8:
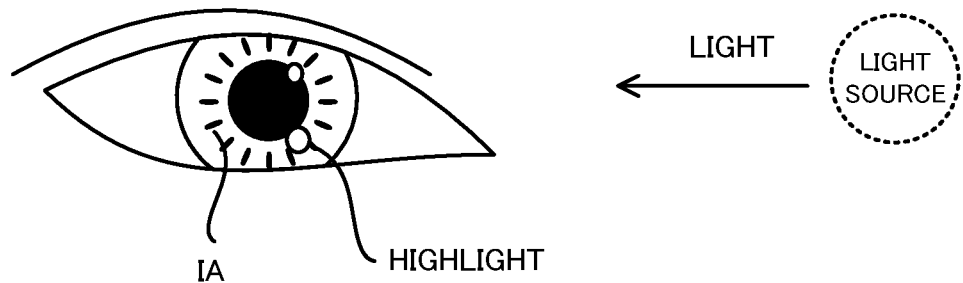
FIG. 8 illustrates the iris area on which a noise patten (a highlight) is superimposed.

When the position of the light source is estimated, the iris information concealment unit 212 may generate the noise pattern that imitates the reflection pattern (what we call the highlight) that is expected to be formed on the iris of the target person in a situation where the target person is illuminated with the light from the light source that is located at the estimated position. For example, the iris information concealment unit 212 may generate the noise pattern that is superimposed on an area in the iris area IA that is located at a direction at which the light source is estimated to be located. As one example, as illustrated in FIG. 8, when it is estimated that the light source is located at a right side (especially, just right side) from the center of the person image IMG1, the iris information concealment unit 212 may generate the noise pattern that is superimposed on an area in the iris area IA that is located at a right side at which the light source is estimated to be located. As a result, the iris information concealment unit 212 is capable of generating the protected image IMG2 to which the target person or the user is less likely to feel the feeling of strangeness. Namely, the iris information concealment unit 212 is capable of generating the protected image IMG2 in which the appearance of the iris is more natural (in other words, is not unnatural excessively).

The state of the light source may include an intensity of the light source (for example, an intensity of the light from the light source). In this case, the iris information concealment unit 212 may estimate the intensity of the light source based on a magnitude relationship among the brightnesses of the plurality of pixels of the person image IMG1. For example, the iris information concealment unit 212 may estimate the intensity of the light source so that the estimated intensity of the light source becomes higher as the brightnesses of the plurality of pixels of the person image IMG1 become higher.

When the intensity of the light source is estimated, the iris information concealment unit 212 may generate the noise pattern that imitates the reflection pattern (what we call the highlight) that is expected to be formed on the iris of the target person in a situation where the target person is illuminated with the light having the estimated intensity. As a result, the iris information concealment unit 212 is capable of generating the protected image IMG2 to which the target person or the user is less likely to feel the feeling of strangeness. Namely, the iris information concealment unit 212 is capable of generating the protected image IMG2 in which the appearance of the iris is more natural (in other words, is not unnatural excessively).

(4) Fourth Example Embodiment

Next, a fourth example embodiment of the image processing apparatus, the image processing method and the recording medium will be described. In the below described description, the fourth example embodiment of the image processing apparatus, the image processing method and the recording medium will be described by using an image processing apparatus 4 to which the fourth example embodiment of the image processing apparatus, the image processing method and the recording medium is adapted.

The image processing apparatus 4 in the fourth example embodiment is different from at least one of the image processing apparatus 2 in the second example embodiment to the image processing apparatus 3 in the third example embodiment in that the iris information concealment unit 212 may use the reflection pattern that is actually included in the person image IMG1 when the noise pattern that imitates the reflection pattern (what we call the highlight) corresponding to the reflection light from the iris (see FIG. 6D) is superimposed on at least a part of the iris area IA. Another feature of the image processing apparatus 4 may be same as another feature of at least one of the image processing apparatuses 2 to 3.

Figure 9:
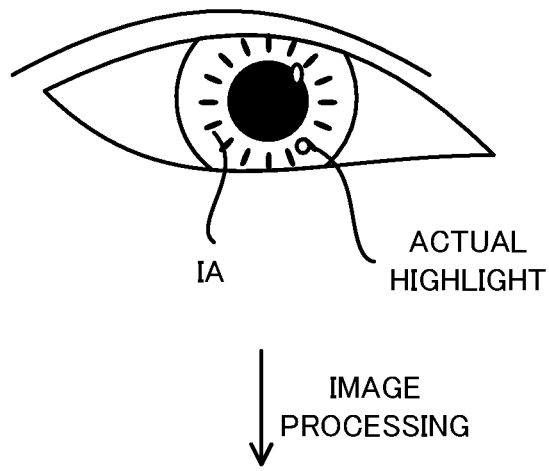
FIG. 9 illustrates the iris area on which the noise patten (the highlight) is superimposed.
Figure 9:
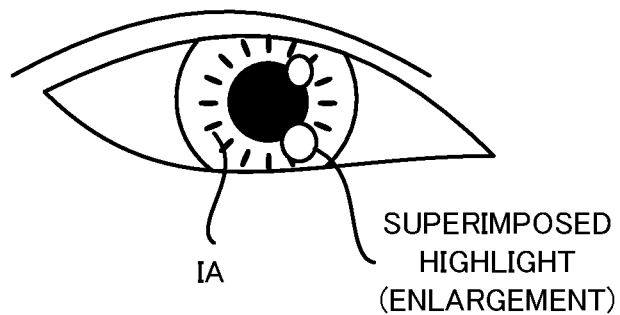

Specifically, the iris information concealment unit 212 may generates, as the noise pattern that is superimposed on at least a part of the iris area IA, a pattern that is obtained by enlarging the reflection pattern that is actually included in the person image IMG1. Alternatively, the iris information concealment unit 212 may enlarge the reflection pattern that is actually included in the person image IMG1. In any case, as illustrated in FIG. 9, the fact remains that the pattern that is obtained by enlarging the reflection pattern that is actually included in the person image IMG1 is included in at least a part of the iris area IA. In this case, since the reflection pattern that is actually included in the person image IMG1 is used, the iris information concealment unit 212 is capable of generating the protected image IMG2 in which the appearance of the iris is natural (in other words, is not unnatural excessively) even when the reflection pattern that is actually included in the person image IMG1 is enlarged. Moreover, there is a lower possibility that the iris information is obtained from the iris area IA, because the size of the area in the iris area IA that is covered by the reflection pattern (the highlight) becomes larger. Thus, the abuse of the iris information is prevented more properly.

Alternatively, the iris information concealment unit 212 may generates, as the noise pattern that is superimposed on at least a part of the iris area IA, a pattern that is obtained by increasing a brightness of the reflection pattern that is actually included in the person image IMG1, in addition to or instead of enlarging the reflection pattern that is actually included in the person image IMG1. Alternatively, the iris information concealment unit 212 may increase the brightness of the reflection pattern that is actually included in the person image IMG1. In any case, the fact remains that the pattern that is obtained by increasing the brightness of the reflection pattern that is actually included in the person image IMG1 is included in at least a part of the iris area IA. In this case, since the reflection pattern that is actually included in the person image IMG1 is used, the iris information concealment unit 212 is capable of generating the protected image IMG2 in which the appearance of the iris is natural (in other words, is not unnatural excessively) even when the brightness of the reflection pattern that is actually included in the person image IMG1 is increased.

(5) Fifth Example Embodiment

Next, a fifth example embodiment of the image processing apparatus, the image processing method and the recording medium will be described. In the below described description, the fifth example embodiment of the image processing apparatus, the image processing method and the recording medium will be described by using an image processing apparatus 5 to which the fifth example embodiment of the image processing apparatus, the image processing method and the recording medium is adapted.

The image processing apparatus 5 in the fifth example embodiment is different from at least one of the image processing apparatus 2 in the second example embodiment to the image processing apparatus 4 in the fourth example embodiment in that it may perform the above described personal information protection operation on an image (typically, the person image IMG1) to which the meta data is not added although the target person is included therein. Another feature of the image processing apparatus 5 may be same as another feature of at least one of the image processing apparatuses 2 to 4.

Figure 10:
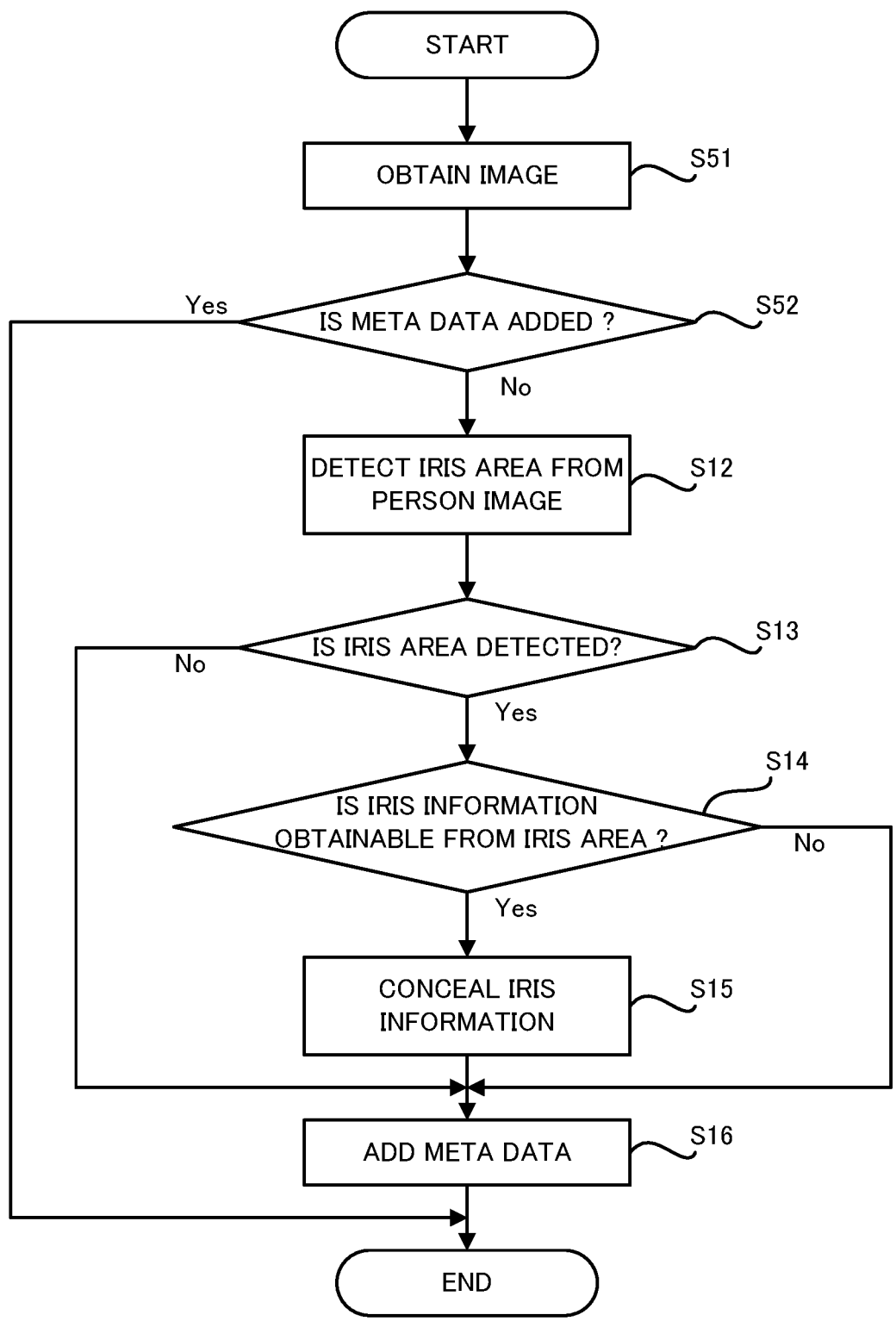
FIG. 10 is a flow chart that illustrates a flow of a personal information protection operation that is performed by an image processing apparatus in a fifth example embodiment.

Next, with reference to FIG. 10, the personal information protection operation in the fifth example embodiment will be described. FIG. 10 is a flowchart that illustrates a flow of the personal information protection operation in the fifth example embodiment.

As illustrated in FIG. 10, the iris information concealment unit 212 obtains an image (a step S51). Then, the iris information concealment unit 212 determines whether or not the meta data is added to the image obtained at the step S51 (a step S52). When it is determined that the meta data is added to the obtained image (the step S52: Yes), it is estimated that the obtained image is the protected image IMG2 in which the iris information is concealed. Therefore, in this case, the iris information concealment unit 212 may not perform the image processing for concealing the iris information on the obtained image. Namely, the image processing apparatus 5 may not perform the operation from the step S12 to the step S16 in FIG. 10. On the other hand, when it is determined that the meta data is not added to the obtained image (the step S52: No), it is estimated that the obtained image is the person image IMG1 in which the iris information is not concealed. Therefore, in this case, the iris information concealment unit 212 may perform the image processing for concealing the iris information on the obtained image. Namely, the image processing apparatus 5 may perform the operation from the step S12 to the step S16 in FIG. 10. As a result, the abuse of the iris information is prevented more properly.

The iris information concealment unit 212 may obtain a plurality of images from a storage apparatus (for example, the above described storage apparatus 22) that stores the plurality of images, and collectively determine whether or not the meta data is added to the plurality of images. Furthermore, the iris information concealment unit 212 may collectively perform the image processing for concealing the iris information on the plurality of (alternatively, at least one) images to which the meta data is not to be added. Namely, the image processing apparatus 5 may extract the plurality of images in which the iris information is not protected based on the meta data and protect the iris information of the plurality of extracted images collectively.

When the image processing apparatus 5 is adapted to the server (for example, the server that provides the service in which a large number of unspecified users are allowed to use the image (for example, the SNS) described above), the iris information concealment unit 212 may collectively determine whether or not the meta data is added to the plurality of images that are already uploaded from the client terminal such as the smartphone. Furthermore, the iris information concealment unit 212 may perform the image processing for concealing the iris information collectively on the plurality of (alternatively, at least one) images to which the meta data is not to be added. As a result, even when the person image IMG1 in which the iris information is not protected is uploaded to the server, the abuse of the iris information is prevented more properly. Alternatively, the image processing apparatus 5 may prohibit a large number of unspecified users from using the image to which the meta data is not added (namely, the image in which the iris information is not protected). Even in this case, the abuse of the iris information is prevented more properly.

(6) Sixth Example Embodiment

Next, a sixth example embodiment of the image processing apparatus, the image processing method and the recording medium will be described. In the below described description, the sixth example embodiment of the image processing apparatus, the image processing method and the recording medium will be described by using an image processing apparatus 6 to which the sixth example embodiment of the image processing apparatus, the image processing method and the recording medium is adapted.

The image processing apparatus 6 in the sixth example embodiment is different from at least one of the image processing apparatus 2 in the second example embodiment to the image processing apparatus 5 in the fifth example embodiment in that the input apparatus 24 may be configured to receive an input of an information for selecting the person image IMG1 on which the personal information protection operation should be performed. Furthermore, the image processing apparatus 6 is different from at least one of the image processing apparatuses 2 to 5 in that the iris information concealment unit 212 may perform the personal information protection operation on the selected person image IMG1. Another feature of the image processing apparatus 6 may be same as another feature of at least one of the image processing apparatuses 2 to 5.

Figure 11:
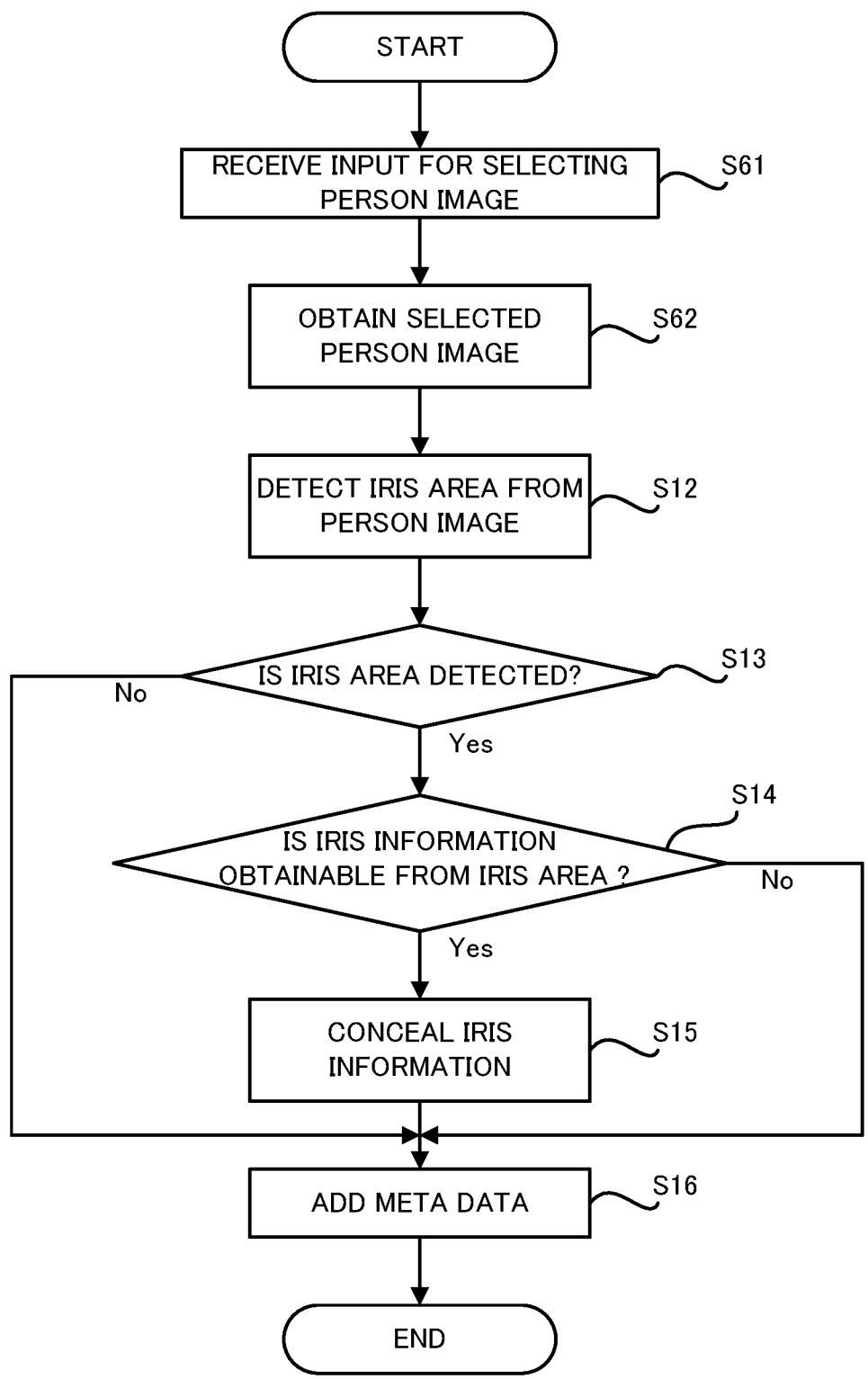
FIG. 11 is a flow chart that illustrates a flow of a personal information protection operation that is performed by an image processing apparatus in a sixth example embodiment.

Next, with reference to FIG. 11, the personal information protection operation in the sixth example embodiment will be described. FIG. 11 is a flowchart that illustrates a flow of the personal information protection operation in the sixth example embodiment.

As illustrated in FIG. 11, the input apparatus 24 receives the input of the information for selecting the person image IMG1 on which the personal information protection operation should be performed (a step S61). As one example, the input apparatus 24 may be configured to receive the input of the information for selecting, from the plurality of person images IMG1, at least one person image IMG1 on which the personal information protection operation should be performed. For example, the input apparatus 24 may be configured to receive the input of the information for selecting, from the plurality of person images IMG1 stored in the storage apparatus 22, at least one person image IMG1 on which the personal information protection operation should be performed. For example, when the image processing apparatus 6 is adapted to the server (for example, the server that provides the service in which a large number of unspecified users are allowed to use the image (for example, the SNS) described above), the input apparatus 24 may be configured to receive the input of the information for selecting, from the plurality of person images IMG1 that are already uploaded from the client terminal such as the smartphone, at least one person image IMG1 on which the personal information protection operation should be performed. In this case, the target person may be regarded to select at least one person image IMG1 on which the personal information protection operation should be performed by using the input apparatus 24.

Then, specifically, the iris are detection unit 211 obtains the person image IMG1 that is selected at the step S61 (a step S62). On the other hand, the iris are detection unit 211 may not obtain the person image IMG1 that is not selected at the step S61. Then, the image processing apparatus 6 may perform the operation from the step S12 to the step S16 on the person image IMG1 obtained at the step S12. As a result, the image processing apparatus 6 is capable of certainly performing the image processing for concealing the iris information on the person image IMG1 in which the target person and the like needs the protection of the iris information.

(7) Seventh Example Embodiment

Next, a seventh example embodiment of the image processing apparatus, the image processing method and the recording medium will be described. In the below described description, the seventh example embodiment of the image processing apparatus, the image processing method and the recording medium will be described by using an image processing apparatus 7 to which the seventh example embodiment of the image processing apparatus, the image processing method and the recording medium is adapted.

Figure 12:
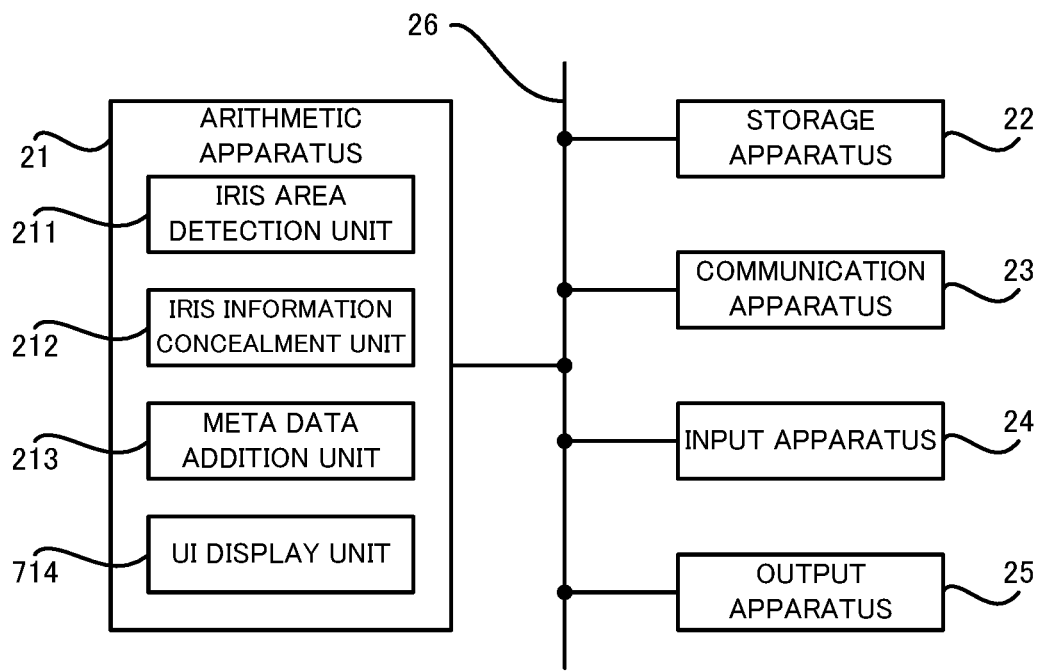
FIG. 12 is a block diagram that illustrates a configuration of an image processing apparatus in a seventh example embodiment.

Firstly, with reference to FIG. 12, a configuration of the image processing apparatus 7 in the seventh example embodiment will be described. FIG. 12 is a block diagram that illustrates the configuration of the image processing apparatus 7 in the seventh example embodiment. As illustrated in FIG. 12, the image processing apparatus 7 in the seventh example embodiment is different from at least one of the image processing apparatus 2 in the second example embodiment to the image processing apparatus 5 in the fifth example embodiment in that the arithmetic apparatus 21 may include an UI (User Interface) display unit 714 that is a logical processing block. The UI display unit 714 may control the output apparatus 25 (especially, the display apparatus) to display a display object 77 for notifying an information relating to the protection of the iris information. Another feature of the image processing apparatus 7 may be same as another feature of at least one of the image processing apparatuses 2 to 6.

Figure 13:
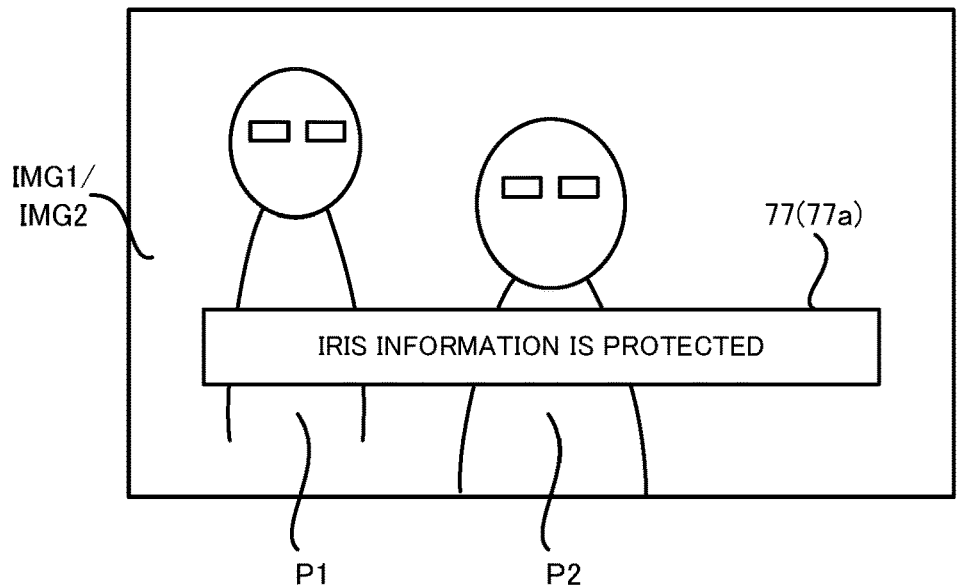
FIG. 13 illustrates an display object in the seventh example embodiment.

FIG. 13 illustrates a first example of the display object 77. As illustrated in FIG. 13, the display object 77 may include a text message 77a that indicates whether or not the iris information is protected. In an example illustrated in FIG. 13, the display object 77 is displayed together with the person image IMG1 or the protected image IMG2 and an example in which the display object 77 includes the text message 77a indicating that the iris information of each of target persons P1 and P2 included in the person image IMG1 or the protected image IMG2 is protected is illustrated.

Figure 14:
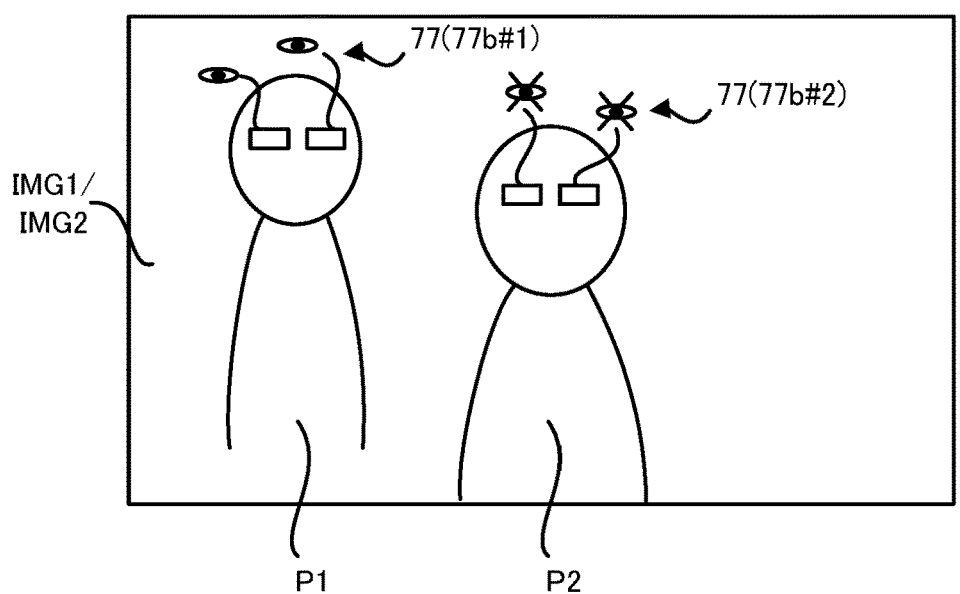
FIG. 14 illustrates the display object in the seventh example embodiment.

FIG. 14 illustrates a second example of the display object 77. As illustrated in FIG. 14, the display object 77 may include an icon 77b, the number of which is equal to the number of the target person, that individually indicates whether or not the iris information of a right eye and a left eye of the target person are protected. In an example illustrated in FIG. 14, the display object 77 is displayed together with the person image IMG1 or the protected image IMG2 and an example in which the display object 77 includes the icon 77b #1 indicating that the iris information of both eyes of the target person P1 included in the person image IMG1 or the protected image IMG2 is protected and the icon 77b #2 indicating that the iris information of both eyes of the target person P2 included in the person image IMG1 or the protected image IMG2 is not protected is illustrated.

Figure 15A:
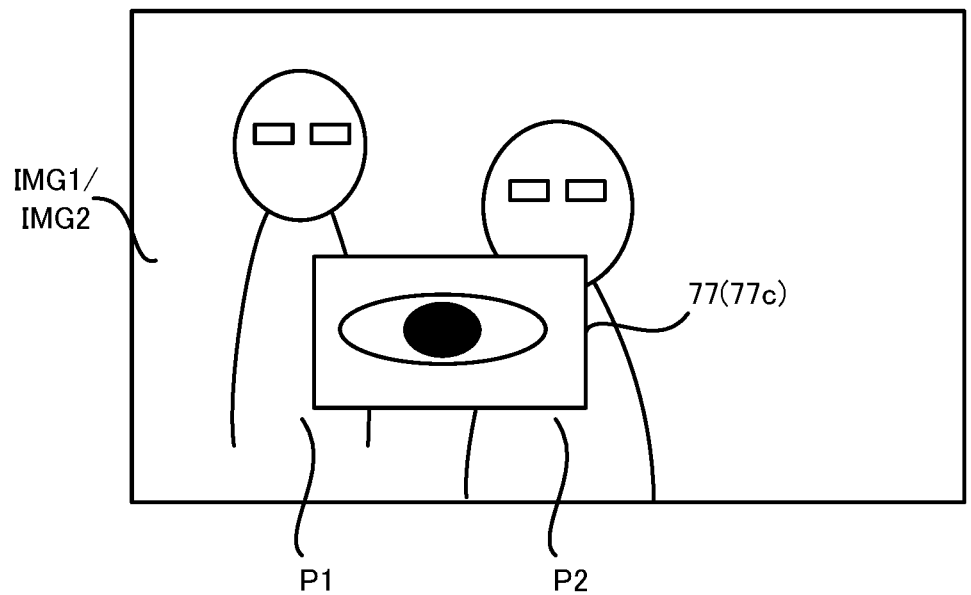
FIG. 15 Each of FIG. 15A to FIG. 15B illustrates the display object in the seventh example embodiment.
Figure 15B:
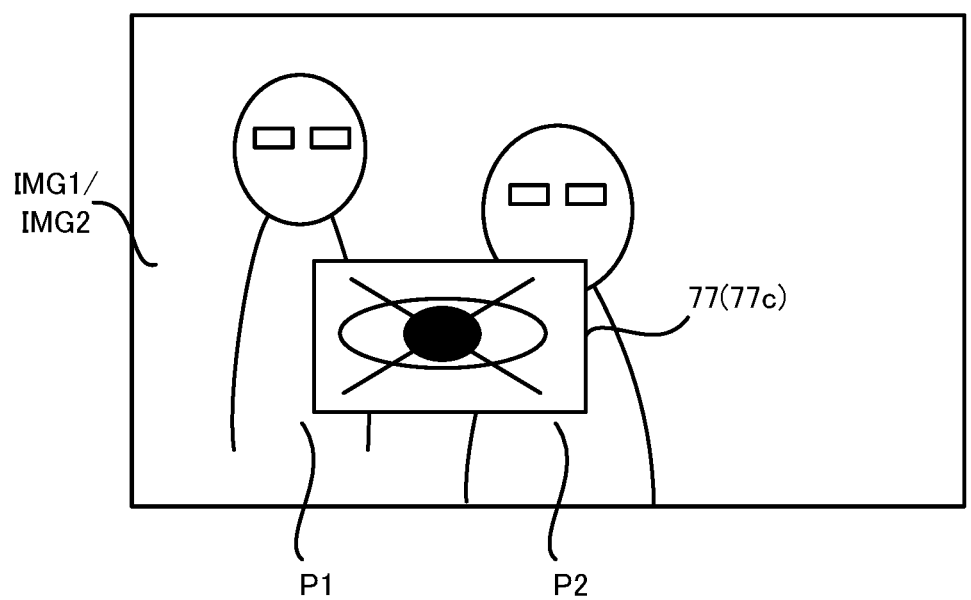

FIG. 15A and FIG. 15B illustrate a third example of the display object 77. As illustrated in FIG. 15A and FIG. 15B, the display object 77 may include an icon 77c that collectively indicates whether or not the iris information of the target person include in the person image IMG1 or the protected image IMG2 is protected. In an example illustrated in FIG. 15A, the display object 77 is displayed together with the person image IMG1 or the protected image IMG2 and an example in which the display object 77 includes the icon 77c indicating that the iris information of both of the target persons P1 and P2 included in the person image IMG1 or the protected image IMG2 are protected is illustrated. In an example illustrated in FIG. 15B, the display object 77 is displayed together with the person image IMG1 or the protected image IMG2 and an example in which the display object 77 includes the icon 77c indicating that the iris information of at least one eye of at least one of the target persons P1 and P2 included in the person image IMG1 or the protected image IMG2 is not protected is illustrated.

When the display object 77 is displayed, the target person can recognize easily whether or not the iris information is protected by checking the display object 77. As a result, the target person can achieve the feeling of safety that the abuse of the iris information of the target person is prevented.

The UI display unit 714 may control the output apparatus 25 to display the display object 77 at a desired timing. For example, the UI display unit 714 may control the output apparatus 25 to display the display object 77 at a timing at which the image including the target person is outputted to another apparatus (namely, an apparatus outside the image processing apparatus 7). As one example, the UI display unit 714 may control the output apparatus 25 to display the display object 77 at a timing of the upload to an external server (for example, the server that provides the service in which a large number of unspecified users are allowed to use the image (for example, the SNS) described above).

(8) Eighth Example Embodiment

Next, an eighth example embodiment of the image processing apparatus, the image processing method and the recording medium will be described. In the below described description, the eighth example embodiment of the image processing apparatus, the image processing method and the recording medium will be described by using an image processing apparatus 8 to which the eighth example embodiment of the image processing apparatus, the image processing method and the recording medium is adapted.

(8-1) Configuration of Image Processing Apparatus 8

Figure 16:
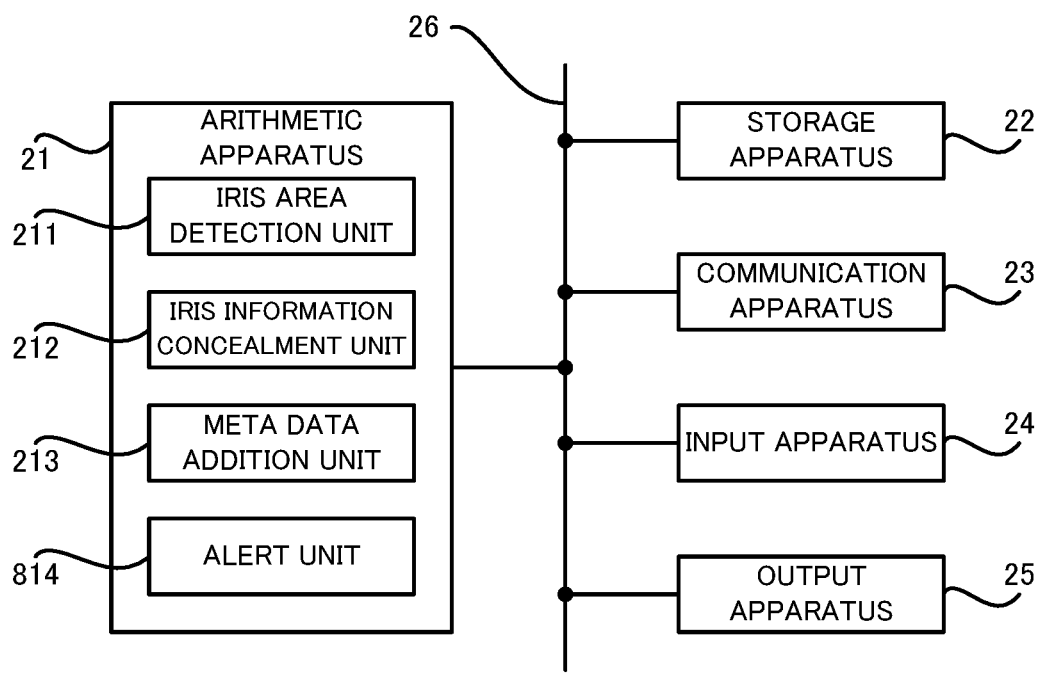
FIG. 16 is a block diagram that illustrates a configuration of an image processing apparatus in an eighth example embodiment.

Firstly, with reference to FIG. 16, a configuration of the image processing apparatus 8 in the eighth example embodiment will be described. FIG. 16 is a block diagram that illustrates the configuration of the image processing apparatus 8 in the eighth example embodiment.

As illustrated in FIG. 16, the image processing apparatus 8 in the eighth example embodiment is different from at least one of the image processing apparatus 2 in the second example embodiment to the image processing apparatus 7 in the seventh example embodiment in that the arithmetic apparatus 21 may include an alert unit 814 that is the logical processing block. Another feature of the image processing apparatus 7 may be same as another feature of the image processing apparatus 2. Note that a detail of an operation of the alert unit 814 will be described later in detail with reference to FIG. 17 and so on.

(2-2) Personal Information Protection Operation Performed by Image Processing Apparatus 2

Figure 17:
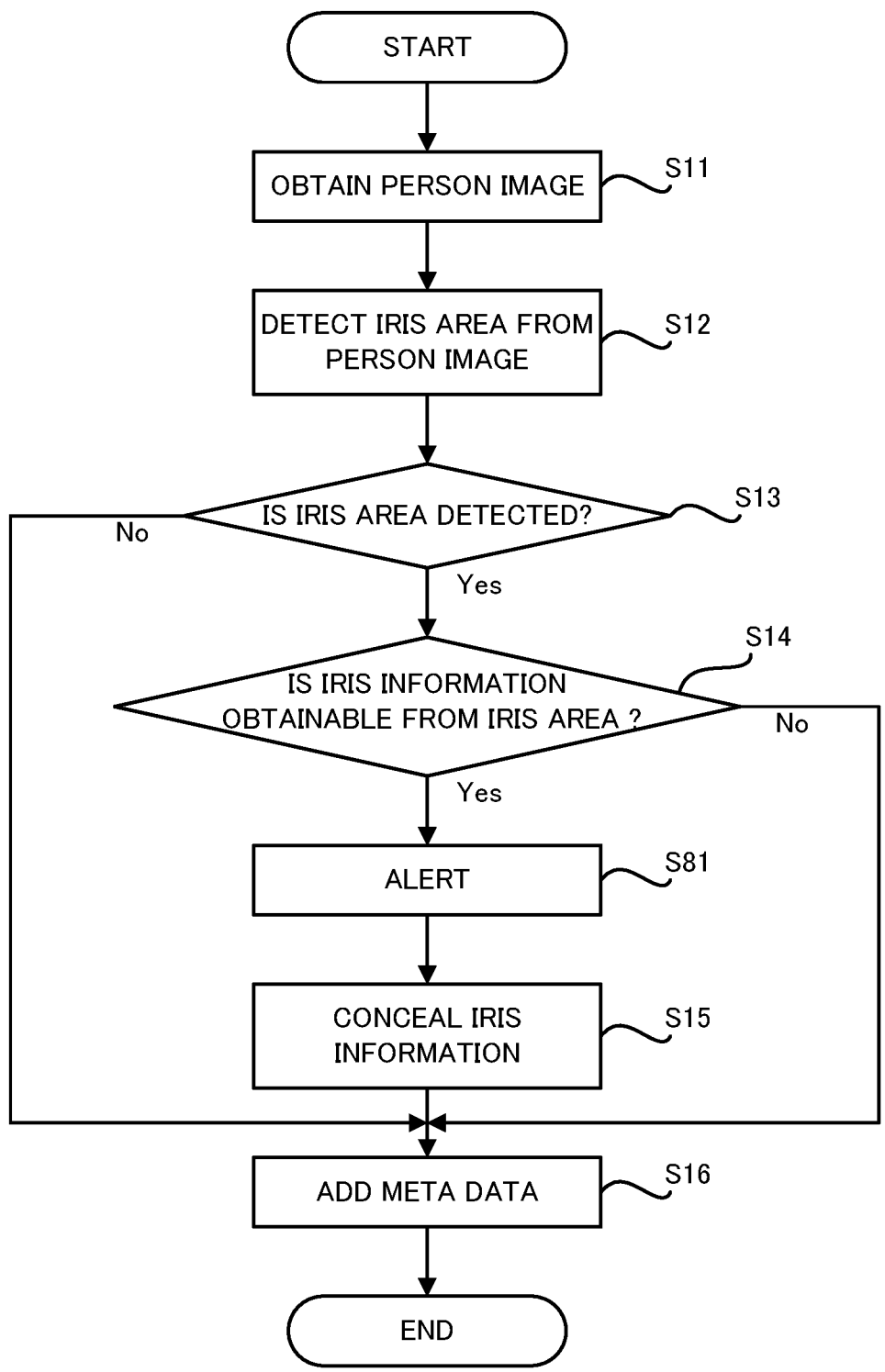
FIG. 17 is a flow chart that illustrates a flow of a personal information protection operation that is performed by an image processing apparatus in the eighth example embodiment.

Next, with reference to FIG. 17, the personal information protection operation that is performed by the image processing apparatus 8 in the eighth example embodiment will be described. FIG. 17 is a flowchart that illustrates a flow of the personal information protection operation that is performed by the image processing apparatus 8 in the eighth example embodiment.

As illustrated in FIG. 17, even in the eighth example embodiment, the image processing apparatus 8 performs the operation from the step S11 to the step S14, as with the second example embodiment.

Figure 18:
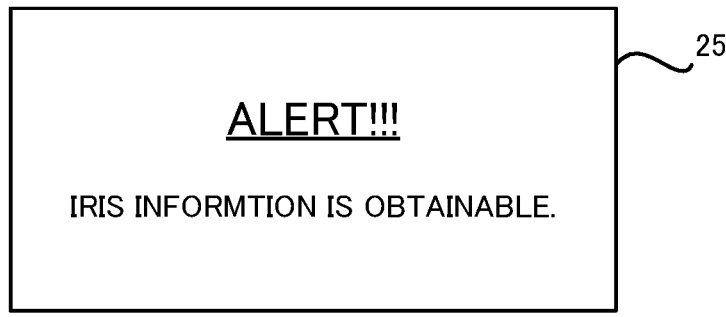
FIG. 18 illustrates an alert image displayed by an alert unit.

In the eighth example embodiment, when it is determined that the iris information is obtainable from the iris area IA as a result of the determination at the step S14 (the step S14: Yes), the alert unit 814 alerts the target person that the iris information is obtainable from the iris area IA (a step S81). For example, the alert unit 814 may alert the target person that the iris information is obtainable from the iris area IA by using the output apparatus 25. As one example, when the output apparatus 25 includes the display apparatus, the alert unit 814 may control the output apparatus 25 (namely, the display apparatus) to display an alert image for alerting the target person that the iris information is obtainable from the iris area IA as illustrated in FIG. 18. In this case, the target person that is alerted by the alert unit 814 can pay attention to the necessity for protecting the iris information. For example, the target person can pay attention to the necessity for concealing the iris information that is not yet protected.

Figure 19:
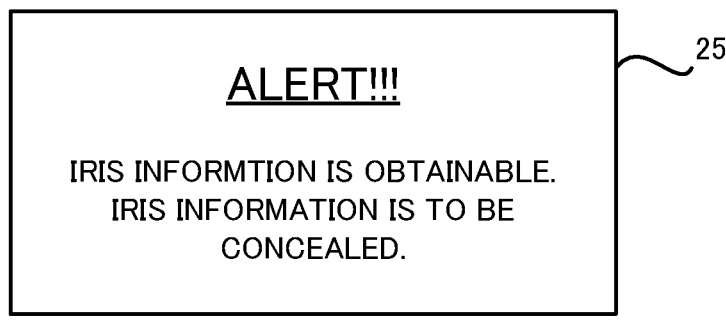
FIG. 19 illustrates a notification image displayed by the alert unit.

After the alert unit 814 alerts the target person that the iris information is obtainable from the iris area IA, the iris information concealment unit 212 conceals the iris information (the step S15). In this case, the alert unit 814 may notify the target person that the iris information is to be concealed. For example, as illustrated in FIG. 19, the alert unit 814 may control the output apparatus 25 (namely, the display apparatus) to display a notification image for notifying the target person that the iris information is to be concealed. As a result, the target person can recognize easily that the iris information that is not yet concealed is to be concealed. Thus, the target person can achieve the feeling of safety that the abuse of the iris information of the target person is prevented.

Figure 20:
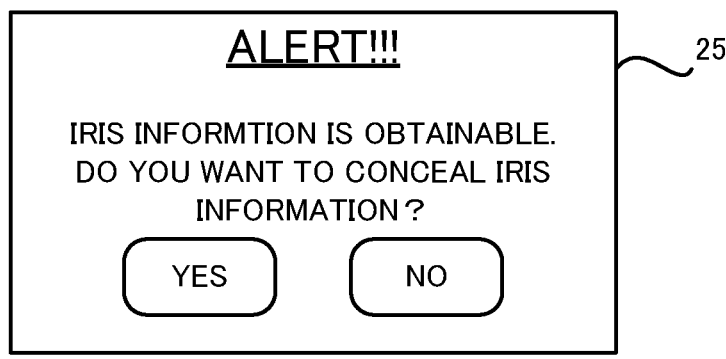
FIG. 20 illustrates an inquiry image displayed by the alert unit.

The alert unit 814 may inquire of the target person whether or not the target person wants to conceal the iris information before the iris information concealment unit 212 conceals the iris information. For example, as illustrated in FIG. 20, as illustrated in FIG. 20, the alert unit 814 may control the output apparatus 25 (namely, the display apparatus) to display an inquiry image for inquiring of the target person whether or not the target person wants to conceal the iris information. In this case, the iris information concealment unit 212 may conceal the iris information when the target person wants to conceal the iris information. On the other hand, the iris information concealment unit 212 may not conceal the iris information when the target person does not want to conceal the iris information.

(9) Ninth Example Embodiment

Next, a ninth example embodiment of the image processing apparatus, the image processing method and the recording medium will be described. In the below described description, the ninth example embodiment of the image processing apparatus, the image processing method and the recording medium will be described by using an image processing apparatus 9 to which the ninth example embodiment of the image processing apparatus, the image processing method and the recording medium is adapted.

Figure 21:
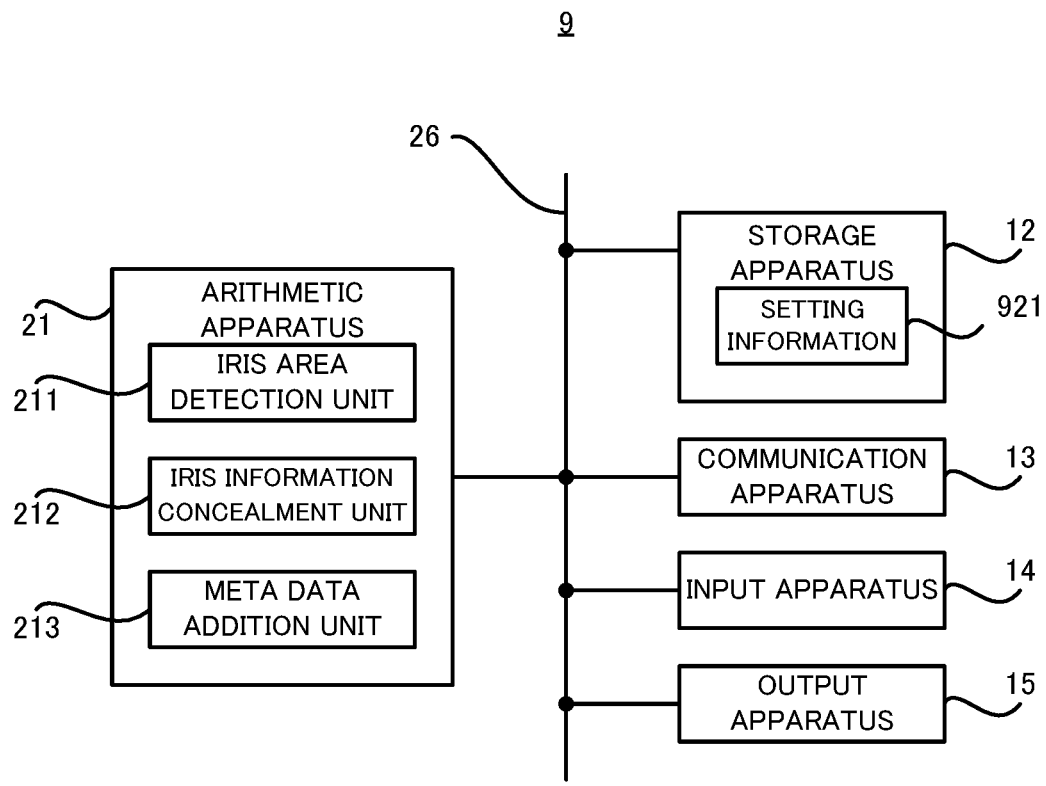
FIG. 21 is a block diagram that illustrates a configuration of an image processing apparatus in a ninth example embodiment.

With reference to FIG. 21, a configuration of the image processing apparatus 9 in the ninth example embodiment will be described. FIG. 21 is a block diagram that illustrates the configuration of the image processing apparatus 9 in the ninth example embodiment.

As illustrated in FIG. 21, the image processing apparatus 9 in the ninth example embodiment is different from at least one of the image processing apparatus 2 in the second example embodiment to the image processing apparatus 8 in the eighth example embodiment in that a setting information 921 is stored in the storage apparatus 22. Another feature of the image processing apparatus 9 may be same as another feature of at least one of the image processing apparatuses 2 to 8.

The setting information 921 is an information relating to the protection of the iris information of the target person. The iris information concealment unit 212 conceals the iris information based on the setting information 921. As a result, the iris information concealment unit 212 is capable of concealing the iris information in a proper aspect for each target person.

For example, the setting information 921 may include a concealment flag information that indicates whether or not the iris information of the target person should be concealed (namely, protected). The iris information concealment unit 212 may conceal the iris information of the target person when the concealment flag information indicates that the iris information of the target person should be concealed. On the other hand, the iris information concealment unit 212 may not conceal the iris information of the target person when the concealment flag information indicates that the iris information of the target person is not necessarily concealed.

For example, the setting information 921 may include a concealment method information that indicates a method for concealing (namely, a method for protecting) the iris information of the target person. For example, when the iris information is concealed by filling at least a part of the iris area IA with the predetermined color as described above, the concealment method information may designate a color with which at least a part of the iris information is filled. For example, when the iris information is concealed by superimposing the superimposed pattern on at least a part of the iris area IA as described above, the concealment method information may designate a type of the superimposed pattern that is superimposed on at least a part of the iris information.

The setting information 921 may be prepared for each target person. For example, the storage apparatus 22 may store a first setting information 921 that is an information relating to the protection of the iris information of a first target person and a second setting information 921 that is an information relating to the protection of the iris information of a second target person that is different from the first target person. In this case, the iris information concealment unit 212 may identify the target person included in the person image IMG1, obtain the setting information corresponding to the identified target person and conceal the iris information of the identified target person based on the obtained setting information 921.

(10) Supplementary Note

With respect to the example embodiments described above, the following Supplementary Notes will be further disclosed.

[Supplementary Note 1]

An information processing apparatus including:
a detecting unit that detects an iris area including an iris from a person image in which at least an eye of the target person is included;
an image processing unit that performs an image processing on at least a part of the iris area of the person image; and
an adding unit that adds a processing information relating to the image processing to the person image on which the image processing is already performed.

[Supplementary Note 2]

The image processing apparatus according to Supplementary Note 1, wherein
the image processing unit performs, as the image processing, a processing for estimating, based on a brightness of the person image, a state of an light source of a light with which the target person is illuminated, generating a noise pattern that imitates a reflection light from the iris based on an estimated result of the state of the light source, and superimposing the generated noise pattern on at least a part of the iris area.

[Supplementary Note 3]

The image processing apparatus according to Supplementary Note 1 or 2, wherein
when a reflection pattern that corresponds to a reflection light from the iris is included in the iris area, the image processing unit performs, as the image processing, a processing using the reflection pattern on at least a part of the iris area.

[Supplementary Note 4]

The image processing apparatus according to any one of Supplementary Notes 1 to 3, wherein
the image processing unit performs the image processing on at least a part of the iris area when the processing information is not added to the person image.

[Supplementary Note 5]

The image processing apparatus according to any one of Supplementary Notes 1 to 4, wherein
the image processing unit receives an input for selecting at least one person image from a plurality of person images and performs the image processing on at least a part of the iris area of at least one selected person image.

[Supplementary Note 6]

An image processing method including:
detecting an iris area including an iris from a person image in which at least an eye of the target person is included;
performing an image processing on at least a part of the iris area of the person image; and
adding a processing information relating to the image processing to the person image on which the image processing is already performed.

[Supplementary Note 7]

A recording medium on which a computer program that allows a computer to execute an image processing method is recorded,
the image processing method including:
detecting an iris area including an iris from a person image in which at least an eye of the target person is included;
performing an image processing on at least a part of the iris area of the person image; and
adding a processing information relating to the image processing to the person image on which the image processing is already performed.

At least a part of the feature of each embodiment described above may be combined with at least other part of the feature of each embodiment described above. A part of the feature of each embodiment described above may not be used. Moreover, the disclosures of all documents (for example, publications) that are cited in the present disclosure described above are incorporated in the present disclosure by reference if it is legally permitted.

The present disclosure is allowed to be changed, if desired, without departing from the essence or spirit of the invention which can be read from the claims and the entire specification, and an image processing apparatus, an image processing method and a recording medium, which involve such changes, are also intended to be within the technical scope of the present disclosure.

DESCRIPTION OF REFERENCE CODES

1, 2, 3, 4, 5, 6, 7, 8, 9 image processing apparatus
11 detection unit
12 image processing unit
13 addition unit
21 arithmetic apparatus
211 iris area detection unit
212 iris information concealment unit
213 meta data addition unit
714 UI display unit
77 display object
814 alert unit
22 storage apparatus
921 setting information
23 communication apparatus
24 input apparatus
25 output apparatus
IMG1 person image
IMG2 protected image
IA iris image

The invention claimed is:

1. An image processing apparatus comprising:
at least one memory configured to store instructions; and
at least one processor configured to execute the instructions to:
detect an iris area including an iris from a person image in which at least an eye of a target person is included;
perform an image processing on at least a part of the iris area of the person image;
add processing information relating to the image processing to the person image on which the image processing is already performed; and
perform, as the image processing, a processing for estimating, based on a brightness of the person image, a state of a light source of a light with which the target person is illuminated, generating a noise pattern that imitates a reflection light from the iris based on an estimated result of the state of the light source, and superimposing the generated noise pattern on at least a part of the iris area.

2. The image processing apparatus according to claim 1, wherein when a reflection pattern that corresponds to the reflection light from the iris is included in the iris area, the at least one processor is configured to execute the instructions to perform, as the image processing, a processing using the reflection pattern on at least a part of the iris area.

3. The image processing apparatus according to claim 1, wherein the at least one processor is configured to execute the instructions to perform the image processing on at least a part of the iris area when the processing information is not added to the person image.

4. The image processing apparatus according to claim 1, wherein the at least one processor is configured to execute the instructions to receive an input for selecting at least one person image from a plurality of person images and perform the image processing on at least a part of the iris area of at least one selected person image.

5. An image processing method comprising:

detecting an iris area including an iris from a person image in which at least an eye of a target person is included;

performing an image processing on at least a part of the iris area of the person image; and adding processing information relating to the image processing to the person image on which the image processing is already performed; and perform, as the image processing, a processing for estimating, based on a brightness of the person image, a state of a light source of a light with which the target person is illuminated, generating a noise pattern that imitates a reflection light from the iris based on an estimated result of the state of the light source, and superimposing the generated noise pattern on at least a part of the iris area.

6. A non-transitory recording medium on which a computer program that allows a computer to execute an image processing method is recorded, the image processing method comprising:

detecting an iris area including an iris from a person image in which at least an eye of a target person is included;

performing an image processing on at least a part of the iris area of the person image; and adding processing information relating to the image processing to the person image on which the image processing is already performed; and perform, as the image processing, a processing for estimating, based on a brightness of the person image, a state of a light source of a light with which the target person is illuminated, generating a noise pattern that imitates a reflection light from the iris based on an estimated result of the state of the light source, and superimposing the generated noise pattern on at least a part of the iris area.

* * * * *